United States Patent [19]

Kanno

[11] Patent Number: 5,712,734
[45] Date of Patent: Jan. 27, 1998

[54] ZOOM LENS BARREL FOR MOVING LENSES IN THE OPTICAL AXIS DIRECTION WITHOUT INCREASING THE LENGTH OF THE ZOOM LENS BARREL

[75] Inventor: Hideo Kanno, Chiba, Japan

[73] Assignee: Nikon Corporation, Tokyo, Japan

[21] Appl. No.: 545,095

[22] Filed: Oct. 19, 1995

[30] Foreign Application Priority Data

| Nov. 4, 1994 | [JP] | Japan | 6-271426 |
| Nov. 4, 1994 | [JP] | Japan | 6-271427 |
| Nov. 4, 1994 | [JP] | Japan | 6-271428 |
| Nov. 4, 1994 | [JP] | Japan | 6-271429 |
| Nov. 4, 1994 | [JP] | Japan | 6-271430 |

[51] Int. Cl.$^6$ ................................................ G02B 15/14
[52] U.S. Cl. ........................................ 359/701; 359/700
[58] Field of Search ................................ 359/699, 700, 359/701, 823, 694; 396/79

[56] References Cited

U.S. PATENT DOCUMENTS

| 3,765,748 | 10/1973 | Mito | 359/701 |
| 3,890,036 | 6/1975 | Grey | 359/684 |
| 4,255,020 | 3/1981 | Yukio | 359/699 |
| 4,281,907 | 8/1981 | Kamata | 359/700 |
| 4,286,845 | 9/1981 | Kamata | 359/699 |
| 4,945,372 | 7/1990 | Higuchi | 354/199 |
| 4,993,815 | 2/1991 | Yamazaki | 359/699 |
| 5,151,729 | 9/1992 | Takayama | 354/195.12 |
| 5,218,479 | 6/1993 | Chiou | 359/700 |
| 5,289,221 | 2/1994 | Yoon | 354/195.12 |
| 5,371,566 | 12/1994 | Asakura | 354/400 |
| 5,392,160 | 2/1995 | Satoh | 359/695 |
| 5,485,315 | 1/1996 | Nomura | 359/701 |
| 5,488,513 | 1/1996 | Tanaka | 359/699 |
| 5,570,149 | 10/1996 | Wakabayashi | 396/85 |
| 5,583,595 | 12/1996 | Hara | 396/79 |

*Primary Examiner*—David C. Nelms
*Assistant Examiner*—Ricky Mack
*Attorney, Agent, or Firm*—Staas & Halsey

[57] ABSTRACT

A zoom lens barrel attains zooming by moving at least some lenses in the optical axis direction, has a cylindrical lens frame which holds the lenses on its inner circumferential surface side, is formed with a lens cam slot having a spiral shape about the optical axis, is formed with a straight slot extending in a direction parallel to the optical axis, and is movable in the optical axis direction. A cylindrical cam barrel is rotatable about the optical axis and is movable in the optical axis direction. A cylindrical stationary barrel is formed with a cam barrel cam slot having a spiral shape about the optical axis, a lens cam pin, one end portion of which is fixed to the cam barrel, and the other end portion of which is fitted in the lens cam slot of the lens frame, a cam barrel cam pin, one end portion of which is fixed to the cam barrel, and the other end portion of which is fitted in the cam barrel cam slot of the stationary barrel, a lens frame rotation regulation member which is not rotatable about the optical axis direction, and is inserted in the straight slot of the lens frame, and a zoom operation ring which is attached to the stationary barrel to be rotatable about the optical axis, and rotates the cam barrel cam pin without regulating movement, in the optical axis direction, of the cam barrel cam pin.

12 Claims, 8 Drawing Sheets

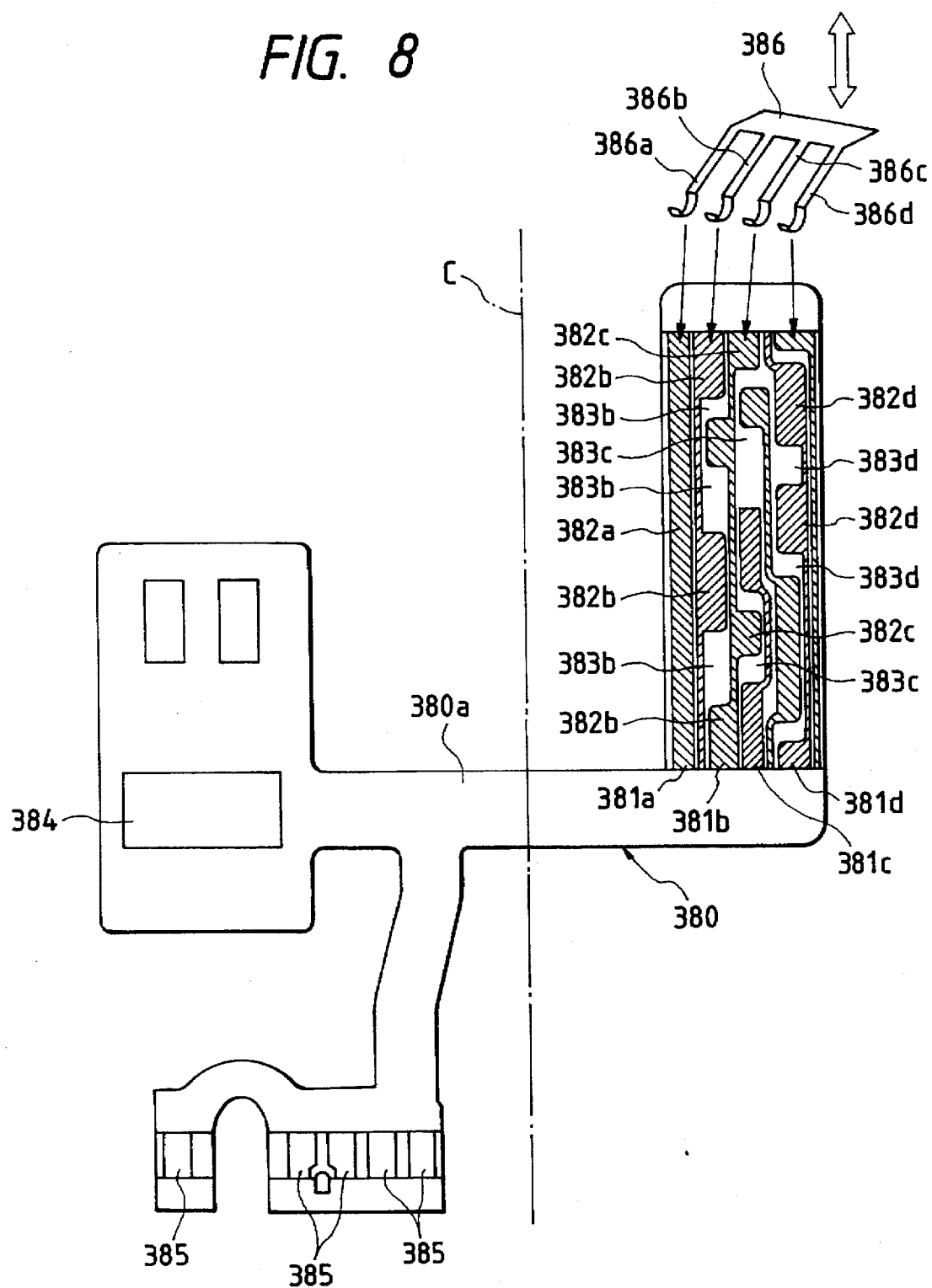

ZOOM LENS BARREL FOR MOVING LENSES IN THE OPTICAL AXIS DIRECTION WITHOUT INCREASING THE LENGTH OF THE ZOOM LENS BARREL

BACKGROUND OF THE INVENTION

1. Field of the Invention

The present invention relates to a zoom lens barrel for moving lenses in the optical axis direction.

2. Related Background Art

As a conventional zoom lens barrel, for example, a lens barrel comprising a lens frame for holding lenses, a cam barrel which is rotatable about the optical axis of the lenses and is formed with a cam slot having "a spiral shape about the optical axis", a cam pin which is fixed to the lens frame and is fitted in the cam slot of the cam barrel, and a zoom operation ring for rotating the cam barrel, is known. In this zoom lens barrel, the cam barrel is rotated about the optical axis by rotating the zoom operation ring, and the rotation of the cam slot upon rotation of the cam barrel moves the cam pin in a direction parallel to the optical axis, thereby moving the lens frame and the lenses in the optical axis direction.

More specifically, the moving amount, in the optical axis direction of the lens frame and the lenses in the prior art is limited within the range of the dimension (length), in the direction parallel to the optical axis, of the spiral cam slot formed on the cam barrel.

In recent years, a zoom lens barrel is required to have a large displacement amount of the focal length, i.e., a large zoom amount, and to have a compact structure. In order to increase the zoom amount, the length, in the direction parallel to the optical axis, of the cam slot must be increased to increase the moving amount of the lenses. For this reason, contrary to the requirement of a compact structure, the length, in the optical axis direction, of the cam barrel inevitably increases. More specifically, in the prior art, if a large zoom amount is to be obtained, a compact zoom lens barrel cannot be obtained.

SUMMARY OF THE INVENTION

The present invention has been made in consideration of the conventional problems, and has as its object to provide a zoom lens barrel which can prevent an increase in size even when the zoom amount increases.

In order to achieve the above object, a zoom lens comprises:

- a cylindrical lens frame which holds lenses on an inner circumferential surface side thereof, is formed with a lens cam slot having a spiral shape about an optical axis, is formed with a straight slot extending in a direction parallel to the optical axis, and is movable in the optical axis direction;
- a cylindrical cam barrel which is rotatable about the optical axis and is movable in the optical axis direction;
- a cylindrical stationary barrel which is formed with a cam barrel cam slot having a spiral shape about the optical axis;
- a lens cam pin, one end portion of which is fixed to the cam barrel, and the other end portion of which is fitted in the lens cam slot of the lens frame;
- a cam barrel cam pin, one end portion of which is fixed to the cam barrel, and the other end portion of which is fitted in the cam barrel cam slot of the stationary barrel;
- a lens frame rotation regulation member which is not rotatable about the optical axis direction, and is inserted in the straight slot of the lens frame; and
- a zoom operation ring which is attached to the stationary barrel to be rotatable about the optical axis, and rotates the cam barrel cam pin without regulating movement, in the optical axis direction, of the cam barrel cam pin.

In this zoom lens barrel, when a photographer rotates the zoom operation ring, the rotational force acts on the cam barrel cam pin. Since this cam barrel can pin is inserted in the cam barrel cam slot having a spiral shape about the optical axis, the cam barrel cam pin and the cam barrel to which the cam pin is fixed move in the optical axis direction while rotating about the optical axis. When the cam barrel rotates and the lens cam pin fixed to the cam barrel rotates, the lens frame formed with the lens cam slot is about to move in the optical axis direction while rotating about the optical axis, but actually moves in only the optical axis direction since rotation about the optical axis is regulated by the rotation regulation member.

As described above, since the cam barrel also moves in the optical axis direction upon rotation of the zoom operation ring, the moving distance of the lens frame upon rotation of the zoom operation ring corresponds to a sum of its moving distance obtained upon rotation of the cam barrel and the moving distance of the cam barrel in the optical axis direction. For this reason, the lens frame can assure a moving amount equal to or larger than the length, in the direction parallel to the optical axis, of the cam slot. Therefore, the zoom amount can be increased without increasing the barrel length in the optical axis direction.

Another zoom lens barrel according to the present invention comprises:

- a cylindrical first lens group frame which holds, on an inner circumferential surface side thereof, a first lens group, which is disposed at a position farthest from the camera main body, of a plurality of lens groups, is formed with a first lens group cam slot having a spiral shape about an optical axis, is formed with a first lens group straight slot extending in a direction parallel to the optical axis, and is movable in the optical axis direction;
- a cylindrical Xth lens group frame which holds, on an inner circumferential surface side thereof, an Xth lens group, which is disposed at a position nearer the camera main body than the first lens group, of the plurality of lens groups, and is movable in the optical axis direction;
- a cylindrical cam barrel which is formed with an Xth lens group cam slot having a spiral shape about the optical axis, is rotatable about the optical axis, and is movable in the optical axis direction;
- a cylindrical stationary barrel which is formed with a cam barrel cam slot having a spiral shape about the optical axis, and is formed with an Xth lens group straight slot extending in the direction parallel to the optical axis;
- a first lens group cam pin, one end portion of which is fixed to the cam barrel, and the other end portion of which is inserted in the first lens group cam slot of the first lens group frame;
- a cam barrel cam pin, one end portion of which is fixed to the cam barrel, and the other end portion of which is inserted in the cam barrel cam slot of the stationary barrel;
- an Xth lens group cam pin, one end portion of which is fixed to the Xth lens group frame, and the other end portion of which is inserted in the Xth lens group cam slot of the cam barrel and the Xth lens group straight slot of the stationary barrel;

a lens frame rotation regulation member, one end portion of which is fixed to the Xth lens group frame, and the other end portion of which is inserted in the first lens group straight slot of the first lens group frame; and a zoom operation ring which is attached to the stationary barrel to be movable about the optical axis, and rotates the cam barrel cam pin without regulating movement, in the optical axis direction, of the cam barrel cam pin.

Still another zoom lens barrel according to the present invention comprises:

a cylindrical first lens group frame which holds, on an inner circumferential surface side thereof, a first lens group, which is disposed at a position farthest from the camera main body, of a plurality of lens groups, forms a portion of an outermost periphery of the lens barrel (to be referred to as a lens frame outermost peripheral portion hereinafter) by a portion thereof, is formed with a first lens group cam slot having a spiral shape about an optical axis, is formed with a first lens group straight slot extending in a direction parallel to the optical axis, and is movable in the optical axis direction;

a cylindrical Xth lens group frame which holds, on an inner circumferential surface side thereof, an Xth lens group, which is disposed at a position nearer the camera main body than the first lens group, of the plurality of lens groups, and is movable in the optical axis direction;

a cylindrical outer frame which has an outer frame outer peripheral portion, that neighbors the lens frame outermost peripheral portion and forms a portion of the outermost periphery of the lens barrel when the first lens group frame is located at a position closest to the camera main body in a moving range thereof in the optical axis direction, and is immovable in the optical axis direction with respect to the camera main body;

a cylindrical movement assist barrel which is formed with an Xth lens group frame slot having a spiral shape about the optical axis, is rotatable about the optical axis, and is movable in the optical axis direction;

a cylindrical stationary barrel which is formed with a movement assist barrel cam slot having a spiral shape about the optical axis, and is formed with an Xth lens group straight slot extending in the direction parallel to the optical axis;

a covering barrel which overlaps the outer frame in the optical axis direction when the first lens group frame is located at the position closest to the camera main body in the moving range thereof in the optical axis direction, and covers a gap formed between the lens frame outermost peripheral portion and the outer frame outer periphery portion upon movement of the first lens group frame in the optical axis direction;

a first lens group cam pin, one end portion of which is fixed to the movement assist barrel, and the other end portion of which is inserted in the first lens group cam slot of the first lens group frame;

a movement assist barrel cam pin, one end portion of which is fixed to the movement assist barrel, and the other end portion of which is inserted in the movement assist barrel cam pin of the stationary barrel;

an Xth lens group cam pin, one end portion of which is fixed to the Xth lens group frame, and the other end portion of which is inserted in the Xth lens group cam slot of the movement assist barrel and the Xth lens group straight slot of the stationary barrel;

a lens frame rotation regulation member which is not rotatable about the optical axis, and is inserted in the first lens group straight slot of the first lens group frame; and a covering barrel coupling member, one end portion of which is fixed to the Xth lens group frame, and the other end portion of which is fixed to the covering barrel.

Preferably, one end portion of the lens frame rotation regulation member is fixed to the Xth lens group frame, and a portion thereof is inserted in the first lens group straight slot of the first lens group frame. Furthermore, preferably, the lens frame rotation regulation member and the covering barrel coupling member are a single member, one end portion thereof is fixed to the Xth lens group frame, the other end portion thereof is fixed to the covering barrel, and a portion thereof is inserted in the first lens group straight slot of the first lens group frame.

In the above description, the outer frame may be a portion of the stationary barrel, a zoom operation ring for rotating the movement assist barrel, or a focus operation ring for performing a focusing operation. More specifically, the outer frame is not limited to a specific member as long as it neighbors the lens frame outermost peripheral portion when the first lens group frame is located at the position closest to the camera main body, has the outer frame outer peripheral portion forming a portion of the outermost periphery of the lens barrel, and is immovable in the optical axis direction with respect to the camera main body (but may be rotatable about the optical axis).

In the above-mentioned zoom lens barrel, when a rotational force about the optical axis or a moving force in the optical axis direction is applied to the movement assist barrel, the rotational force about the optical axis or the moving force in the optical axis direction acts on the movement assist barrel cam pin fixed to the movement assist barrel. Since this cam pin is inserted in the cam barrel cam slot having a spiral shape about the optical axis, the cam pin and the movement assist barrel to which the cam pin is fixed move in the optical axis direction while rotating about the optical axis upon application of the rotational force about the optical axis or the moving force in the optical axis direction to the cam pin.

When the movement assist barrel rotates and the first lens group cam pin fixed to the movement assist barrel rotates, the first lens group frame, on which the first lens group cam slot having a spiral shape about the optical axis is formed, is about to move in the optical axis direction while rotating about the optical axis, but actually moves in only the optical axis direction since its rotation about the optical axis is regulated by the rotation regulation member. On the other hand, when the movement assist barrel rotates, and the Xth lens group cam slot formed on the movement assist barrel rotates, the Xth lens group cam pin inserted in the cam slot is about to move in the optical axis direction while rotating about the optical axis, but actually moves in only the optical axis direction since its rotation about the optical axis is regulated by the Xth lens group straight slot formed on the stationary barrel. Therefore, upon rotation of the movement assist barrel, the Xth lens group frame to which the Xth lens group cam pin is fixed moves in the optical axis direction.

As described above, since the movement assist barrel also moves in the optical axis direction, the moving distance of each lens group frame corresponds to a sum of its moving distance obtained upon rotation of the movement assist barrel and the moving distance of the movement assist barrel in the optical axis direction. For this reason, each lens group frame can assure a moving amount equal to or larger than the length, in the direction parallel to the optical axis, of the cam slot. More specifically, each lens group frame can assure a moving amount equal to or larger than the length, in the direction parallel to the optical axis, of the movement assist barrel. Therefore, a large zoom amount can be assured without increasing the barrel length in the optical axis direction.

In the above description, the movements of the respective lens group frames have been explained under the assumption that a rotational force or a moving force is applied to the movement assist barrel. However, even when a force is applied to move the first lens group frame in the optical axis direction, the lens group frames, the cam pins, the movement assist barrel, and the like in the arrangement of the present invention operate in the same manner as described above although the application direction of the force is reversed to that in the above description. Therefore, in the zoom lens barrel of the present invention, when a rotational force or a moving force is applied to the movement assist barrel or when a moving force in the optical axis direction is applied to the first lens group frame, the respective lens group frames can be moved.

Owing to a large moving amount of each lens group frame like in this embodiment, in order to prevent a gap from being formed between the outer frame and the first lens group frame in a state (telephoto end) wherein the first lens group frame for holding the first lens group arranged at the position farthest from the camera main body is located at the position farthest from the camera main body, the outer frame or the first lens group frame must be prolonged in the optical axis direction. However, this arrangement increases the size of the lens barrel. In order to solve this problem, according to the present invention, the covering barrel is inserted between the first lens group frame and the outer frame, and is moved upon movement of the first lens group frame, thereby covering the gap between the first lens group frame and the outer frame. More specifically, when the lens frame outermost peripheral portion of the first lens frame neighbors the outer frame outer peripheral portion of the outer frame in a state (wide-angle end) wherein the first lens group frame is located at the position closest to the camera main body, the covering barrel is disposed to overlap the outer frame in the optical axis direction, and is coupled to the Xth lens group frame via the covering frame coupling member so as to move in the optical axis direction together with the Xth lens group frame upon movement of the first lens group frame.

In order to achieve the above object, a zoom lens barrel comprises:
a cylindrical first lens group frame which holds, on an inner circumferential surface side thereof, a first lens group, which is disposed at a position farthest from the camera main body, of the plurality of lens groups, is formed with a first lens group cam slot having a spiral shape about an optical axis, is formed with a first lens group straight slot extending in a direction parallel to the optical axis, and is movable in the optical axis direction;
a cylindrical Xth lens group frame which holds, on an inner circumferential surface side thereof, an Xth lens group, which is disposed at a position nearer the camera main body than the first lens group, of the plurality of lens groups, is formed with an Xth lens group cam slot having a spiral shape about the optical axis, and is movable in the optical axis direction while rotating about the optical axis;
a cylindrical stationary barrel which is not rotatable about the optical axis and is immovable in the optical axis direction with respect to the camera main body;
a zoom operation ring which is attached to the stationary barrel to be rotatable about the optical axis, and rotates the Xth lens group frame without regulating movement of the Xth lens group frame in the optical axis direction;
a first lens group cam pin, one end portion of which is fixed to the Xth lens group frame, and the other end portion of which is inserted in the first lens group cam slot of the first lens group frame;
an Xth lens group frame pin, one end portion of which is inserted in the Xth lens group cam slot of the Xth lens group frame, and the other end portion of which is attached to the stationary barrel not to be rotatable about the optical axis; and
a lens frame rotation regulation member which is not rotatable about the optical axis, and is inserted in the first lens group straight slot of the first lens group frame.

In this case, the zoom lens barrel may further comprise:
a cam barrel which is formed with a cam slot, having a spiral shape about the optical axis, for a Yth lens group, and is rotatable about the optical axis and movable in the optical axis direction;
a cam barrel cam pin, one end portion of which is fixed to the cam barrel; and
an Xth lens group guide pin, one end portion of which is fixed to the Xth lens group frame or the cam barrel,
a cam barrel straight slot extending in the direction parallel to the optical axis is formed on the zoom operation ring,
a Yth lens group straight slot extending in the direction parallel to the optical axis and a cam barrel cam slot having a spiral shape about the optical axis are formed on the stationary barrel,
an Xth lens guide slot extending in the direction parallel to the optical axis is formed on one of the Xth lens group frame and the cam barrel,
the other end portion of the cam barrel cam pin, one end portion of which is fixed to the cam barrel, is inserted in the cam barrel cam slot and the cam barrel straight slot,
the other end portion of the Xth lens group cam pin, one end portion of which is inserted in the Xth lens group cam slot of the Xth lens group frame, is inserted in the Yth lens group cam slot and the Yth lens group straight slot, and
the other end portion of the Xth lens group guide pin, one end portion of which is fixed to the Xth lens group frame or the cam barrel, is inserted in the Xth lens guide slot.

In the above-mentioned zoom lens barrel, when a photographer rotates the zoom operation ring, a rotational force about the optical axis acts on the Xth lens group frame. One end portion of the Xth lens group cam pin, the other end portion of which is attached to the stationary barrel not to be rotatable about the optical axis, is inserted in the Xth lens group cam slot having a spiral shape about the optical axis of the Xth lens group frame. For this reason, when the rotational force acts on the Xth lens group frame, the Xth lens group frame moves by a distance $L_x$ in the optical axis direction while rotating about the optical axis.

When the Xth lens group frame rotates, and the first lens group cam pin fixed to the Xth lens group frame rotates, the first lens group frame, on which the first lens group cam slot having a spiral shape about the optical axis is formed, is about to move in the optical axis direction while rotating about the optical axis, but actually moves by a distance $l_1$ in only the optical axis direction since its rotation about the optical axis is regulated by the rotation regulation member. As described above, since the Xth lens group frame also moves by the distance $L_x$ in the optical axis direction upon rotation of the zoom operation ring, the moving distance of the first lens group frame upon rotation of the zoom operation ring corresponds to a sum of the moving distance $l_1$ of the first lens group frame itself upon rotation of the Xth lens group frame, and the moving distance $L_x$ of the Xth lens group frame in the optical axis direction. For this reason, the lens group frame can assure a moving amount equal to or larger than the length, in the direction parallel to the optical axis, of the cam slot. Therefore, a large zoom amount can be assured without increasing the barrel length in the optical axis direction.

In the zoom lens barrel having a cam barrel, when the zoom operation ring is rotated, a rotational force acts on the cam barrel cam pin. Since this cam barrel cam pin is inserted in the cam barrel cam slot, having a spiral shape about the optical axis, of the stationary barrel, the cam barrel cam pin and the cam barrel to which the cam pin is fixed move by a distance $L_c$ in the optical axis direction while rotating about the optical axis. When the cam barrel rotates, and the Yth lens group cam slot formed on the cam barrel rotates, the Xth lens group cam pin is about to move in the direction parallel to the optical axis while rotating about the optical axis along the Yth lens group cam slot. However, in practice, since the Xth lens group cam pin is also inserted in the Yth lens group straight slot extending in the direction parallel to the optical axis, its rotation about the optical axis is regulated by this straight group, and the Xth lens group cam pin moves by a distance $l_y$ in only the direction parallel to the optical axis.

When the cam barrel rotates, the Xth lens group frame rotates about the optical axis upon reception of the rotational force via the Xth lens group guide pin. The Xth lens group cam pin, which is not rotatable about the optical axis since it is fitted in the Yth lens group straight slot of the stationary barrel, is fitted in the Xth lens group cam slot formed on the Xth lens group frame. For this reason, the Xth lens group frame moves by a distance $l_x$ in the optical axis direction by its own rotation.

Therefore, the moving distance of the Xth lens group frame upon rotation of the cam barrel corresponds to a sum of its moving distance $l_y$ upon movement of the Xth lens group cam pin, and the moving distance $l_x$ upon rotation of the Xth lens group frame itself. Since the cam barrel moves by the distance $L_c$ in the optical axis direction while rotating about the optical axis, the moving distance $L_x$ of the Xth lens group frame upon rotation of the zoom operation ring further includes the moving distance $L_c$ of the cam barrel in addition to the above-mentioned moving distance $(l_x+l_y)$.

When the Xth lens group frame moves in the optical axis direction while rotating, the first lens group frame moves by a distance $l_1$ in the optical axis direction as in the former zoom lens barrel.

More specifically, in the zoom lens barrel having a cam barrel, the moving distance of the first lens group frame upon rotation of the zoom operation ring corresponds to a sum of the moving distance $L_c$ of the cam barrel, the moving distance $l_x$ upon rotation of the Xth lens group frame itself, the moving distance $l_y$ upon movement of the Xth lens group cam pin, and the moving distance $l_1$ of the first lens group frame itself upon rotation of the Xth lens group frame. Note that $(L_c+l_x+l_y)$ corresponds to the moving distance $L_x$ of the Xth lens group frame upon rotation of the zoom operation ring.

Another zoom lens barrel of the present invention comprises:

a cylindrical lens frame which is movable in the optical axis direction, has a zoom operation portion operated by a photographer to move the lens frame in the optical axis direction, holds the lenses on an inner circumferential surface side thereof, is formed with a lens cam slot having a spiral shape about the optical axis, and is formed with a straight guide slot extending in a direction parallel to an optical axis;

a cylindrical cam slot which is rotatable about the optical axis and is movable in the optical axis direction;

a cylindrical stationary barrel which is formed with a cam barrel cam slot having a spiral shape about the optical axis;

a lens cam pin, one end portion of which is fixed to the cam barrel, and the other end portion of which is inserted in the lens cam slot of the lens frame;

a cam barrel cam pin, one end portion of which is fixed to the cam barrel, and the other end portion of which is inserted in the cam barrel cam slot of the stationary barrel; and a lens frame rotation regulation member which is not rotatable about the optical axis, and is inserted in the straight guide slot.

In this zoom lens barrel, when a photographer holds the zoom operation portion of the lens frame and applies a force in the optical axis direction thereto, the lens frame moves in the optical axis direction while rotating about the optical axis relative to the lens cam pin fitted in the lens cam slot. However, the lens frame moves in only the optical axis direction with respect to the cam barrel since it is not rotatable about the optical axis due to the presence of the rotation regulation member. Instead, the lens cam pin and the cam barrel to which the cam pin is fixed rotate about the optical axis. When the cam barrel rotates, and a rotational force about the optical axis acts on the cam barrel cam pin fixed to the cam barrel, the cam barrel cam pin moves in the direction parallel to the optical axis while rotating about the optical axis along the cam barrel cam slot formed on the stationary barrel. As a result, the cam barrel to which the cam barrel cam pin is fixed also moves in the optical axis direction while rotating about the optical axis.

For this reason, the moving amount of the lens frame corresponds to a sum of the moving amount, in the optical axis direction, of the lens frame with respect to the cam barrel, and the moving amount of the cam barrel with respect to the stationary barrel. Therefore, since the lens frame can assure a moving amount equal to or larger than the length, in the direction parallel to the optical axis, of the cam slot, a large zoom amount can be assured without increasing the barrel length in the optical axis direction.

Still another zoom lens barrel of the present invention comprises:

a cylindrical first lens group frame which is movable in the optical axis direction, has a zoom operation portion used by the photographer to move the first lens group frame in the optical axis direction, holds, on the inner circumferential surface side thereof, a first lens group disposed at a position farthest from a camera main body and having the largest moving amount in the optical axis direction by a zooming operation of a plurality of lens groups, is formed with a first lens group cam slot having a spiral shape about the optical axis, and is formed with a first lens group straight slot extending in a direction parallel to the optical axis;

a cylindrical Xth lens group frame which holds, on the inner circumferential surface side thereof, an Xth lens group disposed at a position nearer the camera main body than the first lens group and having a smaller moving amount in the optical axis direction than the first lens group of the plurality of lens groups, and is movable in the optical axis direction;

a cylindrical cam barrel formed with an Xth lens group cam slot having a spiral shape about the optical axis;

a cylindrical stationary barrel which is formed with a cam barrel cam slot having a spiral shape about the optical axis, is formed with an Xth lens group straight slot extending in the direction parallel to the optical axis, and is not rotatable about the optical axis direction and immovable in the optical axis direction with respect to the camera main body;

a first lens group cam pin, one end portion of which is fixed to the cam barrel, and the other end portion of which is inserted in the first lens group cam slot of the first lens group frame;

a cam barrel cam pin, one end portion of which is fixed to the cam barrel, and the other end portion of which is inserted in the cam barrel cam slot of the stationary barrel;

an Xth lens group cam pin, one end portion of which is fixed to the Xth lens group frame, and the other end portion of which is inserted in the Xth lens group cam slot of the cam barrel and the Xth lens group straight slot of the stationary barrel;

a lens frame rotation regulation member which is not rotatable about the optical axis, and is inserted in the first lens group straight slot of the first lens group frame;

a conductive brush, a base end portion of which is fixed to one of the Xth lens group frame and the stationary barrel;

a conductor pattern which is fixed to the other of the Xth lens group frame and the stationary barrel so as to contact the distal end portion of the conductive brush, and on which a conductive portion having a conductor and a non-conductive portion having no conductor are formed in the optical axis direction; and zoom position detection means for obtaining a synthesized focal length of the plurality of lens groups by detecting whether the distal end portion of the conductive brush contacts the conductive or non-conductive portion of the conductor pattern.

Preferably, one end portion of the lens frame rotation regulation member is fixed to the Xth lens group frame, and the other end portion thereof is inserted in the first lens group straight slot of the first lens group frame.

In the above description, the synthesized focal length (=zoom position) of the lens groups obtained by the zoom position detection means includes information having a predetermined correlation with this value.

When a photographer holds the zoom operation portion of the first lens group frame and applies a force in the optical axis direction thereto, the first lens group frame moves in the optical axis direction while rotating in the optical axis direction relative to the first lens group cam pin fitted in the first lens group cam slot. However, the first lens group frame moves in only the optical axis direction with respect to the cam barrel since it cannot rotate about the optical axis due to the presence of the rotation regulation member. Instead, the first lens group cam pin and the cam barrel to which the cam pin is fixed rotate about the optical axis.

When the cam barrel rotates, and a rotational force about the optical axis acts on the cam barrel cam pin fixed to the cam barrel, this cam barrel cam pin moves in the direction parallel to the optical axis while rotating about the optical axis along the cam barrel cam slot formed on the stationary barrel. As a result, the cam barrel to which the cam barrel cam pin is fixed also moves in the optical axis direction while rotating about the optical axis.

When the cam barrel rotates, and the Xth lens group cam slot formed on the cam barrel rotates, the Xth lens group cam pin inserted in the cam slot is about to move in the optical axis direction while rotating about the optical axis, but actually moves in only the optical axis direction since its rotation about the optical axis is regulated by the Xth lens group straight slot formed on the stationary barrel. Therefore, when the cam barrel rotates, the Xth lens group frame to which the Xth lens group cam pin is fixed moves in the optical axis direction.

As described above, since the cam barrel also moves in the optical axis direction, the moving distance of each lens group frame corresponds to a sum of its moving distance upon rotation of the cam barrel and the moving distance of the cam barrel in the optical axis direction. For this reason, each lens group frame can assure a moving amount equal to or larger than the length, in the direction parallel to the optical axis, of the cam slot. More specifically, each lens group frame can assure a moving amount equal to or larger than the length, in the direction parallel to the optical axis, of the cam barrel. Therefore, a large zoom amount can be assured without increasing the barrel length in the optical axis direction.

In general, the zoom position (=the synthesized focal length of the lens groups) is detected by detecting the rotation amount of the zoom operation ring or the cam barrel. However, in the present invention, since the zooming operation is executed by moving the first lens group frame in the optical axis direction and no zoom operation ring is provided, the zoom position cannot be detected based on the rotation amount of the zoom operation ring. In this zoom lens barrel, since the cam barrel moves in the optical axis direction while rotating about the optical axis, an encoder for detecting the rotation amount of the cam barrel is complicated. When the moving amount, in the optical axis direction, of the first lens group frame serving as an operation end in the zooming operation, is to be detected, since the moving amount of the first lens group frame is large, the encoder must have a large length and the size of the lens barrel undesirably increases. Thus, in the present invention, the zoom position is detected by detecting the moving amount, in the optical axis direction, of the Xth lens group frame which moves in the optical axis direction upon movement of the first lens group frame but has a considerably smaller moving amount than that of the first lens group frame.

The moving amount, in the optical axis direction, of the Xth lens group frame is detected by detecting whether the distal end of the brush arranged on the stationary barrel or the Xth lens group frame contacts the conductive or non-conductive portion of the conductor pattern arranged on the stationary barrel or the Xth lens group frame.

BRIEF DESCRIPTION OF THE DRAWINGS

FIG. 8 is an exploded view of a flexible printed board according to the third embodiment of the present invention.

DETAILED DESCRIPTION OF THE PREFERRED EMBODIMENTS

The first embodiment of a zoom lens barrel according to the present invention will be described below with reference to the accompanying drawings.

The zoom lens barrel of this embodiment incorporates a plurality of lens groups and is attached to a camera main body. In the following description, the camera main body side will be referred to as a rear side and the object side will be referred to as a front side for the sake of descriptive convenience.

Figure 1:
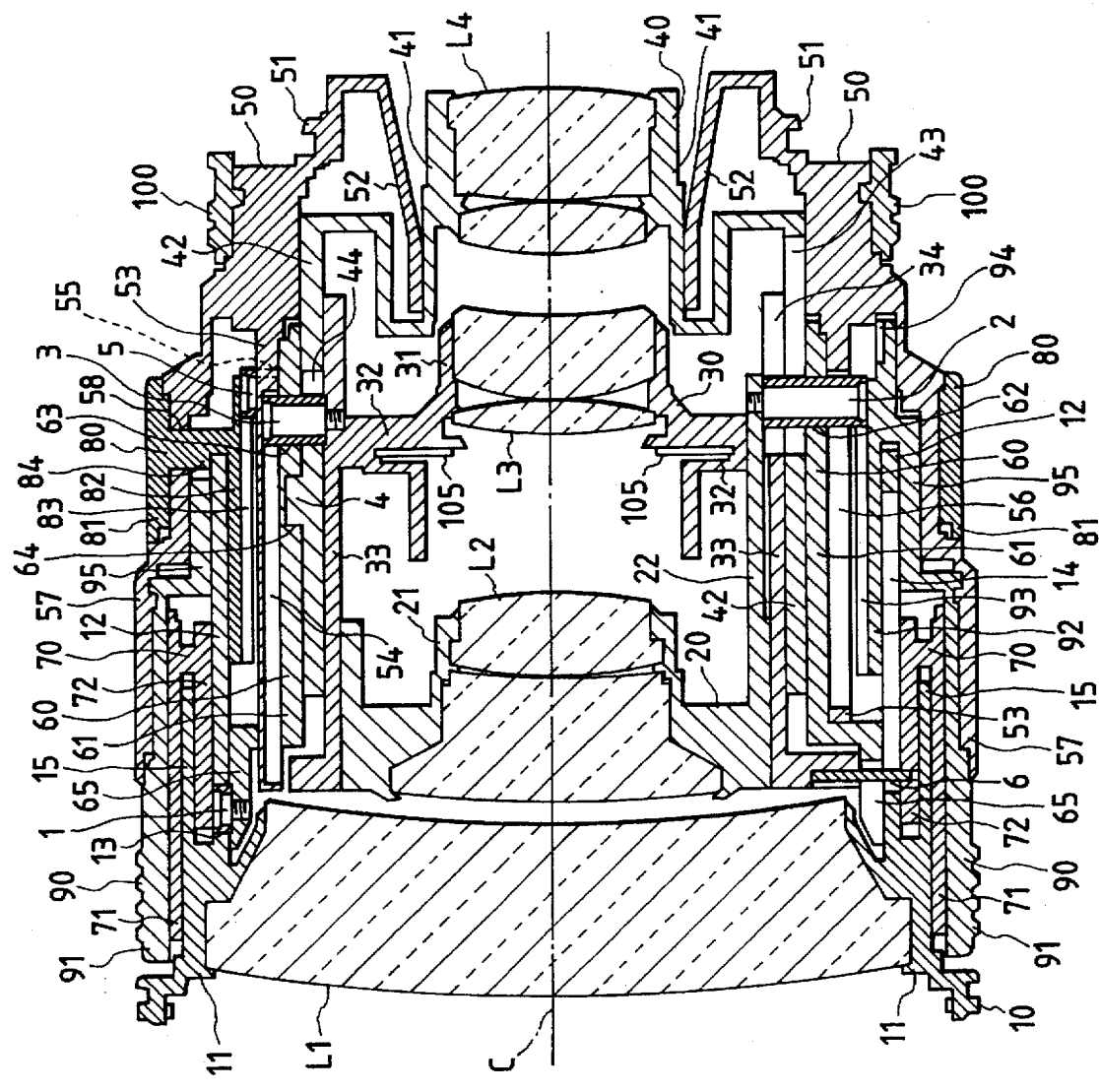
FIG. 1 is a sectional view (wide-angle end) of a zoom lens barrel according to the first embodiment of the present invention.

In this embodiment, the lens groups include, in turn from the front side, a first lens group L1, a second lens group L2, a third lens group L3, and a fourth lens group L4, as shown in FIG. 1.

As shown in FIG. 1, the zoom lens barrel of this embodiment comprises a first lens group frame 10 for holding the first lens group L1, a second lens group frame 20 for holding the second lens group L2, a third lens group frame (Xth lens group frame) 30 for holding the third lens group L3, a fourth lens group frame 40 for holding the fourth lens group L4, a stationary barrel 50 fixed to the camera main body (not shown), a cam barrel (movement assist barrel) 60 on which a plurality of cam slots 62, 63, and 64 are formed, a zoom operation ring 80 used for a zooming operation, a focus operation ring 90 used for a focusing operation, a covering barrel 70 for covering any gap between the first lens group frame 10 and the focus operation ring 90, an aperture operation ring 100 used for an aperture operation, and an aperture mechanism 105 for adjusting the amount of light guided to the camera main body in synchronism with the rotation of the aperture operation ring 100.

The stationary barrel 50 has a mount portion 51 to be attached to the camera main body, an inner barrel portion 52 which extends forward from the mount portion 51 and has a cylindrical shape having an optical axis C of the lens as its center, an intermediate barrel portion 53 which extends forward from the mount portion 51 and has a cylindrical shape having the optical axis C as its center, and an outer barrel portion 57 which extends forward from the mount portion 51 and has a cylindrical shape having the optical axis C as its center. A zoom operation ring through hole 58 is formed on the outer barrel portion 57 of the stationary barrel 50. The through hole 58 extends through the outer barrel portion 57 from its inner to outer circumferential surface side, and extends in a direction about the optical axis. Also, a cam barrel cam slot 55 is formed on the intermediate barrel portion 53 of the stationary barrel 50. The cam slot 55 extends through the intermediate barrel portion 53 from its inner to outer circumferential surface side, and has a spiral shape about the optical axis. Furthermore, a third lens group straight slot 54 is formed on the inner circumferential surface side of the intermediate barrel portion 53 to extend in a direction parallel to the optical axis C.

The cam barrel 60 has a cam slot formation barrel portion 61 which is formed into a cylindrical shape to fit the inner circumferential surface of the intermediate barrel portion 53 of the stationary barrel 50, and an outer barrel portion 65 which is formed into a cylindrical shape to extend from the front end of the intermediate barrel portion 53 of the stationary barrel 50 to its outer circumferential surface side. Second and third lens group cam slots 62 and 63 are formed on the cam slot formation barrel portion 61 of the cam barrel 60 to extend through the cam slot formation barrel portion 61 from its inner to outer circumferential surface side and have a spiral shape about the optical axis. Furthermore, a fourth lens group cam slot 64 is formed on the portion 61. The cam slot 64 has a bottom on the inner surface of the cam slot formation barrel portion 61 and has a spiral shape about the optical axis.

The fourth lens group frame 40 has a lens frame portion 41 which holds the fourth lens group L4, and is formed into a cylindrical shape to fit the inner circumferential surface of the inner barrel portion 52 of the stationary barrel 50, and a barrel portion 42 which extends forward from the lens frame portion 41 and is formed into a cylindrical shape to fit the inner circumferential surface of the cam slot formation barrel portion 61 of the cam barrel 60.

The third lens group frame 30 has a lens frame portion 31 for holding the third lens group L3, an aperture mechanism mount portion 32 provided with the aperture mechanism 105, and a barrel portion 33 which is formed into a cylindrical shape to be located on the outer circumferential surface side of these portions, and to fit the inner circumferential surface of the barrel portion 42 of the fourth lens group frame 40.

The second lens group frame 20 has a lens frame portion 21 for holding the second lens group L2, and a cam pin fixing portion 22 which fits the inner circumferential surface of the barrel portion 33 of the third lens group frame 30 and extends backward from the lens frame portion 21.

The first lens group frame 10 has a lens frame portion 11 for holding the first lens group L1, an inner barrel portion 12 which extends backward from this lens frame portion 11 and has a cylindrical shape having the optical axis C as its center, and an outer barrel portion 15 which extends backward from this lens frame portion 11 and has a cylindrical shape having the optical axis C as its center. The inner and outer barrel portions 12 and 15 of the first lens group frame 10 are located between the outer and intermediate barrel portions 57 and 53 of the stationary barrel 50. A first lens group cam slot 13 and a first lens group straight slot 14 are formed on the inner barrel portion 12 of the first lens group frame 10. The first lens group cam slot 13 extends through the inner barrel portion 12 from its inner to outer circumferential surface side and has a spiral shape about the optical axis. The first lens group straight slot 14 similarly extends through inner barrel portion 12 from its inner to outer circumferential surface side, and extends in the direction parallel to the optical axis C.

The zoom operation ring 80 has an operation ring portion 81 which is formed into a cylindrical shape to fit the outer circumferential surface of the outer barrel portion 57 of the stationary barrel 50, an inner barrel portion 82 which is formed into a cylindrical shape to fit the outer circumferential surface of the intermediate barrel portion 53 of the stationary barrel 50, and a coupling portion 84 which extends through the zoom operation ring through hole 58 of the stationary barrel 50 to couple the operation ring portion 81 and the inner barrel portion 82. A cam barrel straight slot 83 is formed on the inner circumferential surface of the inner barrel portion 82 to extend in the direction parallel to the optical axis C.

The focus operation ring 90 has an operation ring portion 91 which has substantially the same outer diameter as that of the outer barrel portion 57 of the stationary barrel 50 and is located in front of the outer barrel portion 57, a straight slot formation portion 92 which is formed to fit the outer circumferential surface of the intermediate barrel portion 53 of the stationary barrel 50, and a coupling portion 95 for coupling the operation ring portion 91 and the straight slot formation portion 92. A second lens group straight slot 93 extending in the direction parallel to the optical axis C and an inner gear 94 formed about the optical axis are formed on the straight slot formation portion 92. Although not shown, the inner gear 94 meshes with a gear driven by a focusing motor arranged in the camera main body.

The covering barrel 70 has a shielding barrel portion 71, the outer circumferential surface of which contacts the inner circumferential surface of the operation ring portion 91 of the focus operation ring 90 and the inner circumferential surface of which contacts the outer circumferential surface of the outer barrel portion 15 of the first lens group frame 10, and a coupling barrel portion 72 which is coupled to the shielding barrel portion 71 and is formed to be located between the outer and inner barrel portions 15 and 12 of the first lens group frame 10.

A cam barrel cam pin 5 is fixed to the cam slot formation barrel portion 61 of the cam barrel 60 to project radially outwardly. The cam barrel cam pin 5 is inserted in the cam barrel cam slot 55 of the intermediate barrel portion 53 located on the outer circumferential surface side of the cam slot formation portion 61, and in the cam barrel straight slot 83 of the inner barrel portion 82 of the zoom operation ring 80 located on the outer circumferential surface side of the intermediate barrel portion 53. For this reason, when a photographer rotates the zoom operation ring 80, the cam barrel cam pin 5 moves in the direction parallel to the optical axis C while rotating about the optical axis along the cam barrel cam slot 55 formed on the stationary barrel 50. As a result, the cam barrel 60 to which the cam barrel cam pin 5 is fixed also moves in the optical axis direction while rotating about the optical axis.

A third lens group cam pin 3 is fixed to the barrel portion 33 of the third lens group frame 30 to project radially outwardly. The third lens group cam pin 3 is inserted in the third lens group cam slot 63 of the cam barrel 60 located on the outer circumferential surface side of the barrel portion 33, and in the third lens group straight slot 54 of the stationary barrel 50 which is located on the outer circumferential surface side on the cam barrel 60. For this reason, when the cam barrel 60 rotates, and the third lens group cam slot 63 formed on the cam barrel 60 rotates, the third lens group cam pin 3 is about to move in the direction parallel to the optical axis C while rotating about the optical axis along the cam slot 63. However, since the third lens group cam pin 3 is also inserted in the straight slot 54 extending in the direction parallel to the optical axis C, its rotation about the optical axis is regulated by the straight slot 54, and the cam pin 3 moves in only the direction parallel to the optical axis C. As a result, the third lens group frame 30 to which the third lens group cam pin 3 is fixed moves in the optical axis direction without rotating about the optical axis. Since the barrel portion 42 of the fourth lens group frame 40 is located between the intermediate barrel portion 53 of the stationary barrel 50 and the barrel portion 33 of the third lens group frame 30, which are coupled to each other by the third lens group cam pin 3, in addition to the cam slot formation barrel portion 61 of the cam barrel 60, a cam pin escape hole 44 through which the third lens group cam pin 3 extends and which is elongated in the direction parallel to the optical axis C is formed on the barrel portion 42 of the fourth lens group frame 40, so as to prevent the fourth lens group frame 40 from moving upon movement of the third lens group cam pin 3.

A fourth lens group cam pin portion 4 is formed on the outer circumferential surface side of the barrel portion 42 of the fourth lens group frame 40 to project radially outwardly. The fourth lens group cam pin portion 4 is inserted in the fourth lens group cam slot 64 of the cam barrel 60 located on the outer circumferential surface side of the barrel portion 42. For this reason, when the cam barrel 60 rotates, and the fourth lens cam slot 64 formed on the cam barrel 60 rotates, the fourth lens group cam pin portion 4 is about to move in the direction parallel to the optical axis C while rotating about the optical axis along the cam slot 64. Thus, the fourth lens group frame 40 on which the fourth lens group cam pin portion 4 is formed is about to move in the optical axis direction while rotating about the optical axis. However, the fourth lens group frame 40 cannot rotate about the optical axis since the third lens group cam pin 3 which moves in only the direction parallel to the optical axis is inserted in the cam pin escape hole 44 extending in the direction parallel to the optical axis C. Therefore, the fourth lens group frame 40 also moves in the optical axis direction without rotating about the optical axis.

A first lens group cam pin 1 is fixed to the outer barrel portion 65 of the cam barrel 60. The first lens group cam pin 1 is inserted in the first lens group cam slot 13 of the inner barrel portion 12 of the first lens group frame 10. On the other hand, a rotation regulation member 6 is fixed to the front end portion of the barrel portion 33 of the third lens group frame 30, which does not rotate about the optical axis. The rotation regulation member 6 is inserted in the first lens group straight slot 14 of the inner barrel portion 12 of the first lens group frame 10, and its distal end portion is fixed to the coupling barrel portion 72 of the covering barrel 70. For this reason, when the cam barrel 60 rotates and the first lens group cam pin 1 fixed to the cam barrel 60 rotates, the first lens group frame 10 is about to move in the optical axis direction while rotating about the optical axis, but actually moves in only the optical axis direction since its rotation about the optical axis is regulated by the rotation regulation member 6. The covering barrel 70 moves in the optical axis direction together with the third lens group frame 30 upon movement of the third lens group frame 30 in the optical axis direction since it is coupled, by the rotation regulation member 6, to the third lens group frame 30 which moves in only the optical axis direction.

A second lens group cam pin 2 is fixed to the cam pin fixing portion 22 of the second lens group frame 20. This cam pin 2 is inserted in the second lens group cam slot 62 of the cam barrel 60 and the second lens group straight slot 93 of the focus operation ring 90. For this reason, when the cam barrel 60 rotates, and the second lens group cam slot 62 formed on the cam barrel 60 rotates, the second lens group cam pin 2 is about to move in the optical axis direction while rotating about the optical axis accordingly, but actually moves in only the direction parallel to the optical axis C since its rotation about the optical axis is regulated by the second lens group straight slot 93. As a result, when the cam barrel 60 rotates, the second lens group frame 20 to which the second lens group cam pin 2 is fixed moves in the optical axis direction without rotating about the optical axis. Since the rotation of the second lens group cam pin 2 about the optical axis upon rotation of the cam barrel 60 must be regulated, a given frictional force acts between the focus operation ring 90 and the stationary barrel 50 so as to prevent the focus operation ring 90 from rotating when the second lens group cam pin 2 is about to rotate about the optical axis. On the other hand, the second lens group frame 20 also moves in the optical axis direction upon rotation of the focus operation ring 90. More specifically, when the focus operation ring 90 is rotated by the photographer or the focusing motor, the second lens group cam pin 2 receives a rotational force from the second lens group straight slot 93 of the focus operation ring 90. Upon reception of the rotational force, this second lens group cam pin 2 moves in the direction parallel to the optical axis C while rotating about the optical axis along the second lens group cam slot 62 since it is also inserted in the cam slot 62 of the cam barrel 60. As a result, when the focus operation ring 90 rotates, the second lens group frame 20 to which the second lens group cam pin 2 is fixed moves in the optical axis direction while rotating about the optical axis. Note that the barrel portion 33 of the third lens group frame 30, the barrel portion 42 of the fourth lens group frame 40, and the intermediate barrel portion 53 of the stationary barrel 50 are arranged between the cam pin fixing portion 22 of the second lens group frame 20 and the straight slot formation portion 92 of the focus operation ring 90, which are coupled to each other by the second lens group cam pin 2, in addition to the cam slot formation barrel portion 61 of the cam barrel 60. For this reason, cam pin escape notches 34, 43, and 56 for escaping the second lens group cam pin 2 are respectively formed on the barrel portion 33 of the third lens group frame 30, the barrel portion 42 of the fourth group frame 40, and the intermediate barrel portion 53 of the stationary barrel 50, so that the third lens group frame 30, the fourth lens group frame 40, and the stationary barrel 50 are not influenced by the rotation, about the optical axis, and the movement, in the direction parallel to the optical axis C, of the second lens group cam pin 2.

Cylindrical collars are formed on the outer circumferential surfaces of the cam pins 1, 2, . . . , to improve the sliding characteristics with the cam slots 13, 62, . . .

In the above description, the arrangement of the zoom lens barrel of this embodiment and its local operations have been described. The operation of the overall zoom lens barrel of this embodiment will be described below.

When a photographer wants to set the photographing magnification to be a specific value, he or she operates the zoom operation ring 80 about the optical axis. Upon rotation of the zoom operation ring 80, as described above, a rotational force acts from the operation ring 80 onto the cam barrel cam pin 5, and the cam barrel cam pin 5 moves in the direction parallel to the optical axis while rotating about the optical axis along the cam barrel cam slot 55 of the stationary barrel 50. Thus, the cam barrel 60 to which the cam barrel cam pin 5 is fixed also moves in the optical axis direction while rotating about the optical axis.

Figure 3:
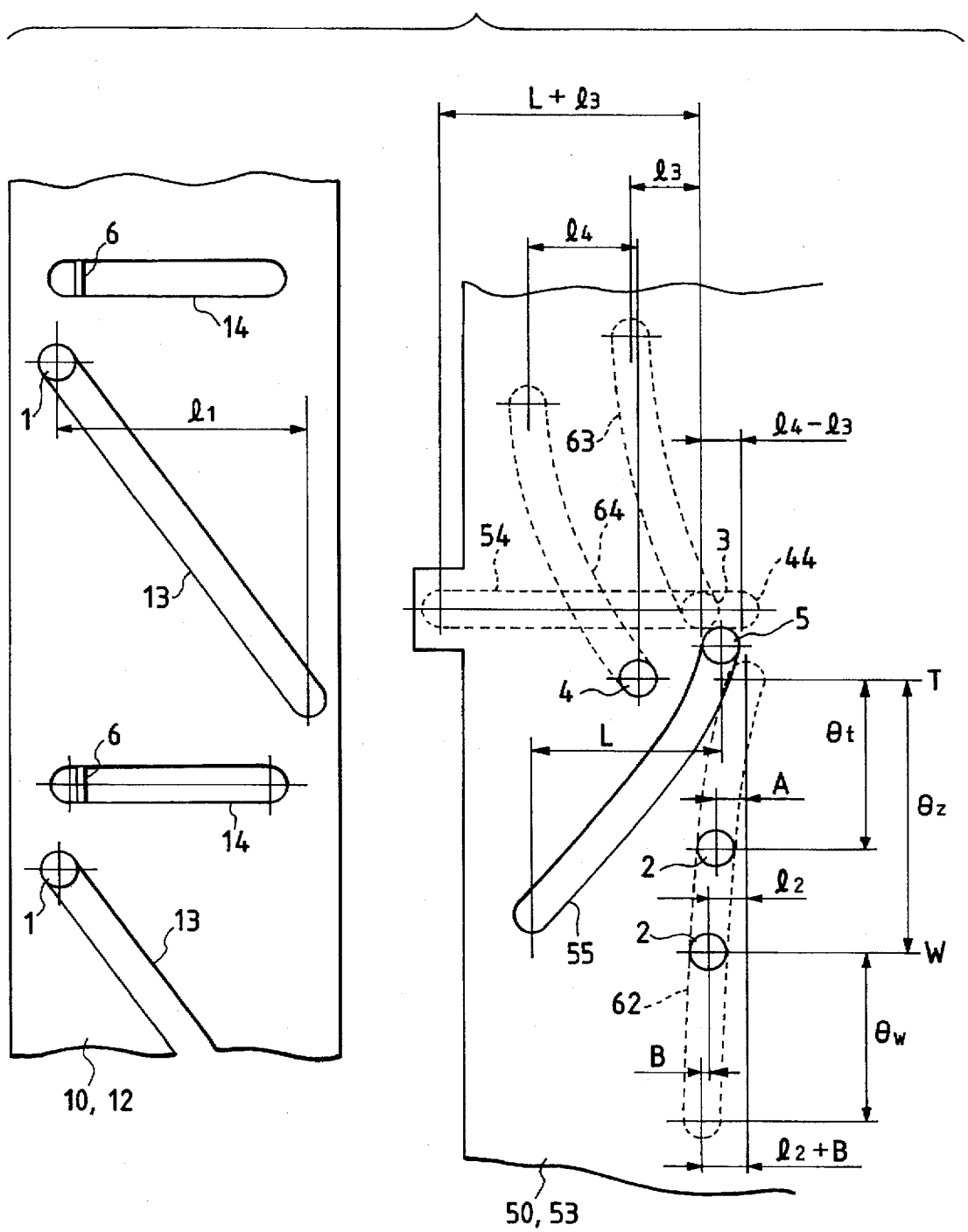
FIG. 3 is an explanatory view showing the relationship between the cam pins and cam slots according to the first embodiment of the present invention.

Let L be the maximum moving distance, in the optical axis direction, of the cam barrel 60, i.e., the length, in the direction parallel to the optical axis, of the cam barrel cam slot 55, as shown in FIG. 3. Also, let $l_1$, $l_2+B$, $l_3$, and $l_4$ respectively be the lengths, in the direction parallel to the optical axis C, of the first lens group cam slot 13, the second lens group cam slot 62, the third lens group cam slot 63, and the fourth lens group cam slot 64, as shown in FIG. 3. Note that $l_2$ is the length required upon rotation of the zoom operation ring 80, and B is the length required upon rotation of the focusing operation ring 90 (upon focusing at the wide-angle side).

When the cam barrel 60 rotates, as described above, the first lens group frame 10 moves in the optical axis direction upon rotation of the first lens group cam pin 1, the second lens group frame 20 moves in the optical axis direction upon rotation of the second lens cam slot 62, the third lens group frame 30 moves in the optical axis direction upon rotation of the third lens cam slot 63, and the fourth lens group frame 40 moves in the optical axis direction upon rotation of the fourth lens group cam slot 64. In this case, the maximum moving distances of the lens group frames 10, 20, 30, and 40 upon rotation of the cam barrel 60 are equal to the lengths $l_1$, $l_2$, $l_3$, and $l_4$, in the direction parallel to the optical axis, of the cam slots 13, 62, 63, and 64. Note that the maximum moving distance of the second lens group frame 20 is $l_2$ required for the zoom operation of the length ($l_2+B$), in the direction parallel to the optical axis, of the second lens group cam slot 62.

Figure 2:
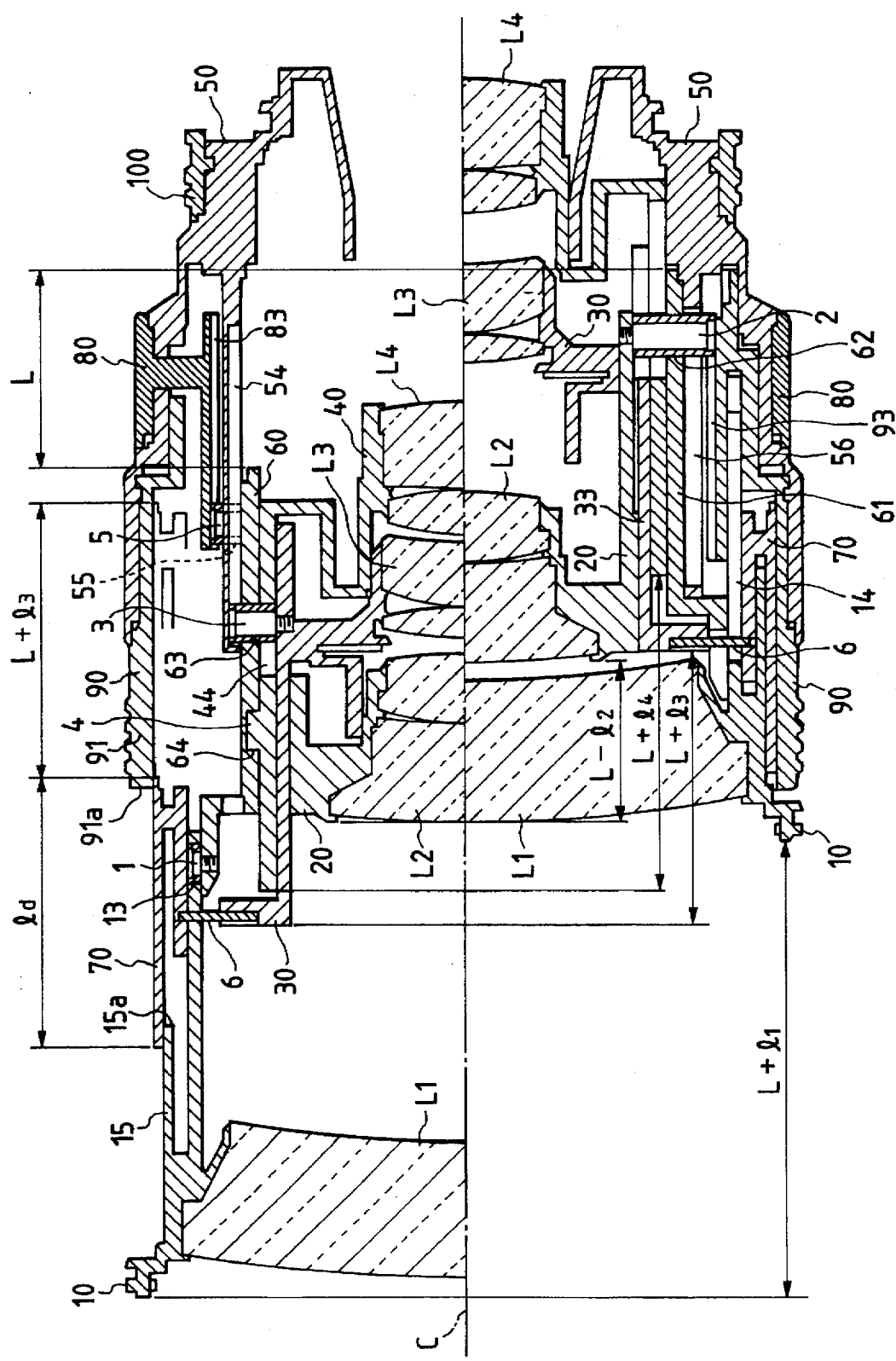
FIG. 2 is a sectional view (its upper half corresponds to the telephone end, and its lower half corresponds to the wide-angle end) of the zoom lens barrel according to the first embodiment of the present invention.

Since the cam barrel 60 also moves in the optical axis direction upon rotation of the zoom operation ring 80, the moving distance, in the optical axis direction, of the cam barrel 60 is added to the moving distances of the lens group frames 10, 20, 30, and 40 upon rotation of the zoom operation ring 80. More specifically, the maximum moving distances of the lens group frames 10, 20, 30, and 40 upon rotation of the zoom operation ring 80 respectively correspond to sums of their maximum moving distances upon rotation of the cam barrel 60 and the maximum moving distance L, in the optical axis direction, of the cam barrel 60, as shown in FIG. 2. Therefore, the maximum moving distance of the first lens group frame 10 is (L+$l_1$), that of the second lens group frame 20 (L–$l_2$), that of the third lens group frame 30 (L+$l_3$), and that of the fourth lens group frame 40 (L+$l_4$). Note that the upper half portion above the central line (=optical axis C) of FIG. 2 shows the lens barrel at the telephoto end, and the lower half portion thereof shows the lens barrel at the wide-angle end. FIG. 2 illustrates the rotation regulation member 6 on both the upper and lower half sides. However, this is to allow easy understanding of the positional and connection relationships between the rotation regulation member 6 and the covering barrel 70, and in practice, the rotation regulation member 6 is only one.

As described above, in this embodiment, the lens group frames 10, 20, 30, and 40 can assure moving amounts equal to or larger than the lengths, in the direction parallel to the optical axis, of the corresponding cam slots 13, 62, 63, and 64 since their moving distances are determined as sums of their moving distances obtained upon rotation, about the optical axis, of the cam barrel 60 and the moving distance, in the optical axis direction, of the cam barrel 60. More specifically, the lens group frames 10, 20, 30, and 40 can assure moving amounts equal to or larger than the length, in the direction parallel to the optical axis C, of the cam barrel 60. Therefore, a large zoom amount can be assured without increasing the barrel size in the direction parallel to the optical axis. In this embodiment, a two-step moving method as a combination of the lens movement upon rotation, about the optical axis, of the cam barrel 60 and the movement, in the optical axis direction, of the cam barrel 60 is applied to all the lens groups. However, it is most effective to apply this moving method to the first lens group L1 having the largest maximum moving amount in the optical axis direction of the lens groups.

In the relative relationship between the cam pin and the cam slot, if the cam slot rotates about the optical axis, the movement of the cam pin must be regulated so that the cam pin moves in the direction parallel to the optical axis without rotating about the optical axis. In this embodiment, as for the second, third, and fourth lens groups L2, L3, and L4 with relatively small maximum moving distances, a straight movement of the cam pin 3 upon rotation of the cam slot 63 is assured by forming the third lens group straight slot 54 on the stationary barrel 50 and inserting the third lens group cam pin 3 in the straight slot 54. However, when the straight slot formed on the stationary barrel 50 is utilized for the first lens group L1 having the largest maximum moving amount in the optical axis direction of the respective lens groups, the length, in the optical axis direction, of the stationary barrel 50 undesirably increases. As for the first lens group L1, in this embodiment, the straight slot 14 and the rotation regulation member 6 fitted in the straight slot are respectively provided to the first and third lens group frames 10 and 30, which move in the optical axis direction and in the same direction although they have different moving distances in the optical axis direction, and the absolute required length of the straight slot is substantially reduced by movement of the frames 10 and 30, thereby making the lens barrel compact. More specifically, the first lens group straight slot 14 is formed on the first lens group frame 10, and the rotation regulation member 6 fitted in the straight slot 14 is formed on the third lens group frame 30 which moves in the optical axis direction upon movement of the first lens group frame 10 but does not rotate about the optical axis, thereby assuring a straight movement of the cam pin 1 relative to the cam slot 13, in this case, a straight movement of the cam slot 13 upon rotation of the cam pin 1.

In this embodiment, since the first lens group frame 10 has a large moving amount, as described above, the focus operation ring 90 or the stationary barrel 50 must be prolonged in the optical axis direction so as not to form a gap between the first lens group frame 10 and the focus operation ring 90, which neighbors the first lens group frame 10 and does not move in the optical axis direction, of members constituting the lens barrel in a state wherein the first lens group frame 10 is located at the frontmost position (telephoto end). However, this increases the size of the lens barrel. In order to solve this problem, in this embodiment, the covering barrel 70 is inserted between the first lens group frame 10 and the focus operation ring 90, and the covering barrel 70 is moved by the third lens group frame 30 which moves upon movement of the first lens group frame 10, thereby covering the gap between the first lens group frame 10 and the focus operation ring 90. More specifically, as shown in FIG. 2, when the first lens group frame 10 and the focus operation ring 90 overlap each other in a state wherein the first lens group frame 10 is located at the rearmost position (wide-angle end), the covering barrel 70 is arranged to overlap the focus operation ring 90. The covering barrel 70 is coupled to the third lens group frame 30 by the rotation regulation member 6, and moves in the optical axis direction together with the third lens group frame 30 upon movement of the first lens group frame 10.

In this embodiment, the covering barrel 70 is coupled to the third lens group frame 30. However, any other structures may be adopted as long as the covering barrel 70 can move upon movement of the first lens group frame 10. For example, the covering barrel 70 may be coupled to the fourth lens group frame 40 using, e.g., a pin, and may move together with the fourth lens group frame 40. In this embodiment, since the second lens group frame 20 moves independently in a focusing operation unlike other lens group frames, it is not preferable to couple the covering barrel 70 and the second lens group frame 20.

As shown in FIG. 2, let ld be the length, in the optical axis direction, of the covering barrel 70 required for covering the gap between a rear edge 15a of the outer barrel portion 15 of the first lens group frame 10 and a front edge 91a of the operation ring portion 91 of the focus operation ring 90 at the telephoto end. When the first lens group frame 10 and the focus operation ring 90 overlap each other at the wide-angle end, as described above, the covering barrel 70 completely overlaps the focus operation ring 90. When the zoom operation ring 80 is rotated, the first lens group frame 10 moves forward, and a gap is formed between the rear edge 15a of the first lens group frame 10 and the front edge 91a of the focus operation ring 90, the covering barrel 70 moves upon movement of the first lens group frame 10. This is because the third lens group frame 30 which moves upon movement of the first lens group frame 10 is coupled to the covering barrel 70 via the rotation regulation member 6. Upon movement of the covering barrel 70, the gap between the rear edge 15a of the first lens group frame 10 and the front edge 91a of the focus operation ring 90 is covered. When no covering barrel 70 is arranged, as described above, the focus operation ring 90 or the stationary barrel 50 must be prolonged by ld in the optical axis direction. However, in this embodiment, when a gap is formed between the rear edge 15a of the first lens group frame 10 and the front edge 91a of the focus operation ring 90 upon movement of the first lens group frame 10, the covering barrel 70 which has completely overlapped the focus operation ring 90 at the wide-angle end moves and covers the gap. For this reason, the focus operation ring 90 or the stationary barrel 50 need not be prolonged by ld in the optical axis direction, and the size of the lens barrel can be prevented from increasing.

When the photographer obtains the target photographing magnification by rotating the zoom operation ring 80, he or she rotates the focus operation ring 90 to perform a focusing operation. Note that the focus operation ring 90 may be manually rotated, but may be rotated by driving the focusing motor arranged in the camera main body. Upon rotation of the focus operation ring 90, as described above, the second lens group cam pin 2 receives the rotational force from the second lens group straight slot 93 of the focus operation ring 90. This cam pin 2 moves in the direction parallel to the optical axis C while rotating about the optical axis upon reception of the rotational force from the focus operation ring 90 since it is inserted in the second lens group cam slot 62 of the cam barrel 60. Therefore, the second lens group frame 20 to which the cam pin 2 is fixed also moves in the optical axis direction while rotating about the optical axis.

The second lens group cam pin 2 and the second lens group cam slot 62 operate not only in the zooming mode but also in the focusing mode. Thus, the relationship between the second lens group cam pin 2 and the second lens group cam slot 62 in the zooming and focusing modes will be briefly described below with reference to FIG. 3.

If the rotation angle of the zoom operation ring 80 is θz, the rotation angle of the second lens group cam pin 2 relative to the second lens group cam slot 62 is also θz. The moving amount, in the direction parallel to the optical axis, of the second lens group cam pin 2 at that time is $l_2$. The moving amount, in the optical axis direction, of the second lens group L2 required for focusing at the telephoto side is A ($<l_2$) in a direction from the telephoto end, T, toward the wide-angle end, W. On the other hand, the moving amount, in the optical axis direction, of the second lens group L2 required for focusing at the wide-angle side is B in the farther direction, from the wide-angle end W to the telephoto end T. Therefore, the moving range of the cam pin 2 upon focusing at the telephoto side falls within the moving range of the cam pin 2 upon rotation of the zoom operation ring 80, but the moving range of the cam pin 2 upon focusing at the wide-angle side falls outside the moving range of the cam pin 2 upon rotation of the zoom operation ring 80. For this reason, the length, in the direction parallel to the optical axis C, of the second lens group cam slot 62 corresponds to a sum of the length $l_2$ required upon rotation of the zoom operation ring 80, and the length B required upon rotation of the focus operation ring 90 at the wide-angle side. In this embodiment, the moving amount B, in the optical axis direction, of the second lens group L2 required for focusing at the wide-angle side is different from its moving amount A at the telephoto side. However, in order to improve the operation feeling of the focus operation ring 90, the second lens group cam slot 62 is shaped so that the relative rotation angle, θw, of the cam pin 2 required for focusing at the wide-angle side is equal to its relative rotation angle θt at the telephoto side.

In the zoom lens barrel of this embodiment, since the cam barrel moves in the optical axis direction while rotating about the optical axis, and the respective lens group frames not only move upon rotation of the cam barrel but also move upon movement, in the optical axis direction, of the cam barrel, the moving amount of the lens, i.e., the zoom amount can be increased without increasing the size of the lens barrel itself.

Even when a gap is formed between the outermost peripheral portion of the first lens group frame and the outer peripheral portion of the outer frame upon movement of the first lens group frame, the gap can be covered by movement of the covering barrel upon movement of the first lens group frame without prolonging the first lens group frame or the outer frame in the optical axis direction.

The second embodiment of a zoom lens barrel according to the present invention will be described below with reference to FIGS. 4 and 5.

The zoom lens barrel of this embodiment incorporates a plurality of lens groups and is attached to a camera main body. In the following description, the camera main body side will be referred to as a rear side and the object side will be referred to as a front side for the sake of descriptive convenience.

Figure 4:
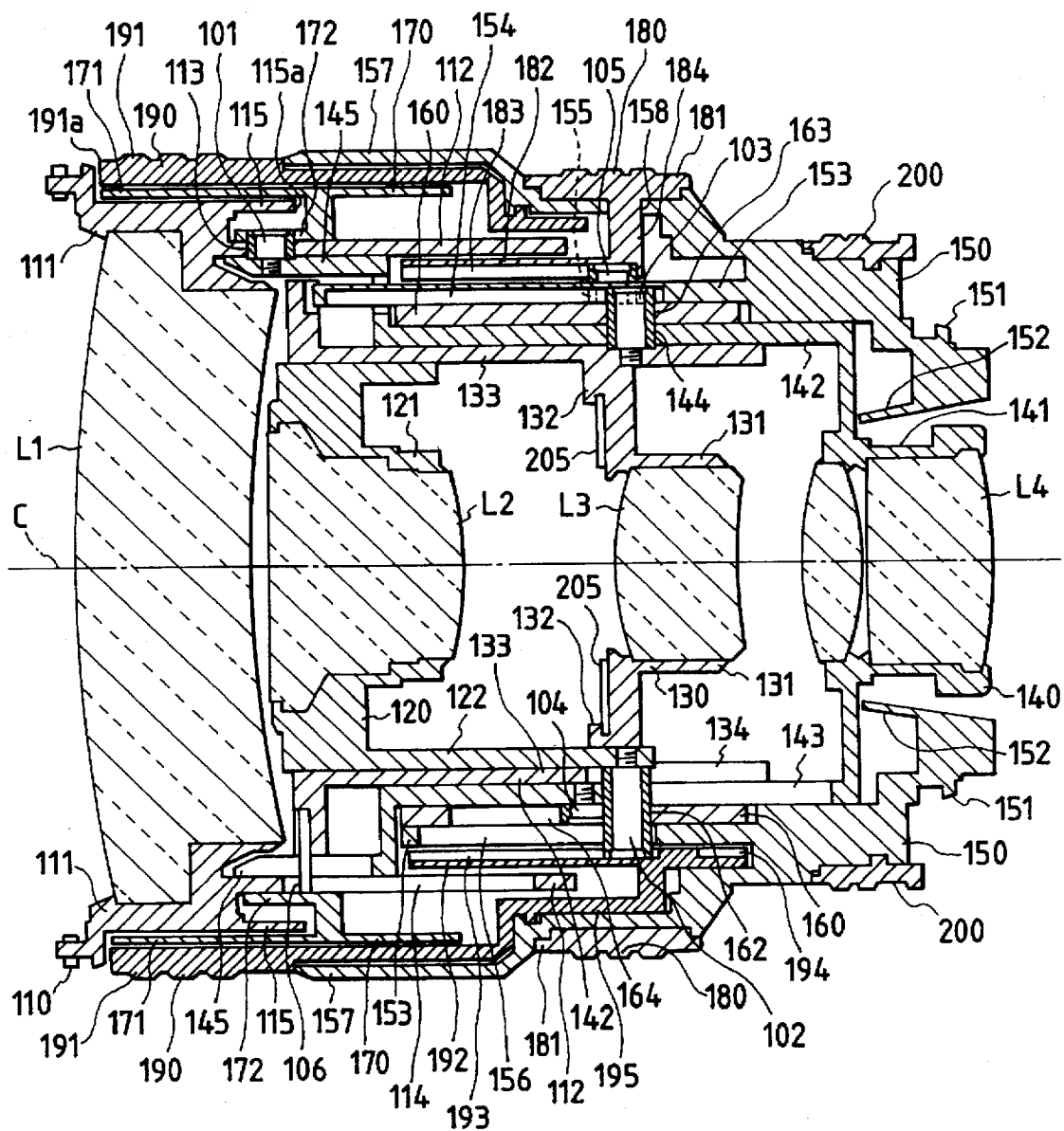
FIG. 4 is a sectional view showing a zoom lens barrel according to the second embodiment of the present invention.

In this embodiment, the lens groups include, in turn from the front side, a first lens group L1, a second lens group L2, a third lens group L3, and a fourth lens group L4, as shown in FIG. 4.

As shown in FIG. 4, the zoom lens barrel of this embodiment comprises a first lens group frame 110 for holding the first lens group L1, a second lens group frame 120 for holding the second lens group L2, a third lens group frame (Yth lens group frame) 130 for holding the third lens group L3, a fourth lens group frame (Xth lens group frame) 140 for holding the fourth lens group L4, a stationary barrel 150 fixed to the camera main body (not shown), a cam barrel 160 on which a plurality of cam slots 162, 163, and the like are formed, a zoom operation ring 180 used for performing a zooming operation, a focus operation ring 190 used for performing a focusing operation, a covering barrel 170 for covering any gap between the first lens group frame 110 and the focus operation ring 190, an aperture operation ring 200 for performing an aperture operation, and an aperture mechanism 205 for adjusting the amount of light guided into the camera body in synchronism with the rotation of the aperture operation ring 200.

The stationary barrel 150 has a mount portion 151 attached to the camera main body, an inner barrel portion 152 which extends forward from the mount portion 151 and has a cylindrical shape having an optical axis C as its center, an intermediate barrel portion 153 which extends forward from the mount portion 151 and has a cylindrical shape having an optical axis C as its center, and an outer barrel portion 157 which extends forward from the mount portion 151 and has a cylindrical shape having an optical axis C as its center. A zoom operation ring through hole 158 is formed on the outer barrel portion 157 of the stationary barrel 150. The through hole 158 extends through the outer barrel portion 157 from its inner to outer circumferential surface side, and extends in a direction about the optical axis. Also, a cam barrel cam slot 155 is formed on the intermediate barrel portion 153 of the stationary barrel 150. The cam slot 155 extends through the intermediate barrel portion 153 from its inner to outer circumferential surface side, and has a spiral shape about the optical axis. Furthermore, a third lens group straight slot (Yth lens group straight slot) 154 is formed on the inner circumferential surface side of the intermediate barrel portion 153 to extend in a direction parallel to the optical axis C.

The cam barrel 160 is formed into a cylindrical shape to fit the inner circumferential surface of the intermediate barrel portion 153 of the stationary barrel 150. A second lens group cam slot 162 and a third lens group cam slot (Yth lens group cam slot) 163 are formed on the cam barrel 160 to extend through the cam barrel 160 from its inner to outer circumferential surface side and have a spiral shape about the optical axis. Furthermore, a fourth lens group guide slot (Xth lens group guide slot) 164 is also formed on the cam barrel 160. The guide slot 164 extends through the cam barrel 160 from its inner to outer circumferential surface side and extends in the direction parallel to the optical axis C.

The fourth lens group frame 140 has a lens frame portion 141 which holds the fourth lens group L4, and is formed into a cylindrical shape to fit the inner circumferential surface of the inner barrel portion 152 of the stationary barrel 150, an inner barrel portion 142 which extends forward from the lens frame portion 141 and is formed into a cylindrical shape to fit the inner circumferential surface of the cam barrel 160, and an outer barrel portion 145 which extends forward from the front edge of the inner barrel portion 142. A fourth lens group cam slot (Xth lens group cam slot) 144, which extends through the inner barrel portion 142 from its inner to outer circumferential surface side, and has a spiral shape about the optical axis, is formed on the inner barrel portion 142.

The third lens group frame 130 has a lens frame portion 131 for holding the third lens group L3, an aperture mechanism mount portion 132 provided with the aperture mechanism 205, and a barrel portion 133 which is formed into a cylindrical shape to be located on the outer circumferential surface side of these portions, and to fit the inner circumferential surface of the inner barrel portion 142 of the fourth lens group frame 140.

The second lens group frame 120 has a lens frame portion 121 for holding the second lens group L2, and a cam pin fixing portion 122 which fits the inner circumferential surface of the barrel portion 133 of the third lens group frame 130 and extends backward from the lens frame portion 121.

The first lens group frame 110 has a lens frame portion 111 for holding the first lens group L1, an inner barrel portion 112 which extends backward from this lens frame portion 111 and has a cylindrical shape having the optical axis C as its center, and an outer barrel portion 115 which extends backward from this lens frame portion 111 and has a cylindrical shape having the optical axis C as its center. The inner and outer barrel portions 112 and 115 of the first lens group frame 110 are located between the outer and intermediate barrel portions 157 and 153 of the stationary barrel 150. A first lens group cam slot 113 and a first lens group straight slot 114 are formed on the inner barrel portion 112 of the first lens group frame 110. The first lens group cam slot 113 extends through the inner barrel portion 112 from its inner to outer circumferential surface side and has a spiral shape about the optical axis. The first lens group straight slot 114 similarly extends through inner barrel portion 112 from its inner to outer circumferential surface side, and extends in the direction parallel to the optical axis C.

The zoom operation ring 180 has an operation ring portion 181 which is formed into a cylindrical shape to fit the outer circumferential surface of the outer barrel portion 157 of the stationary barrel 150, an inner barrel portion 182 which is formed into a cylindrical shape to fit the outer circumferential surface of the intermediate barrel portion 153 of the stationary barrel 150, and a coupling portion 184 which extends through the zoom operation ring through hole 158 of the stationary barrel 150 to couple the operation ring portion 181 and the inner barrel portion 182. A cam barrel straight slot 183 is formed on the inner circumferential surface of the inner barrel portion 182 to extend in the direction parallel to the optical axis C.

The focus operation ring 190 has an operation ring portion 191 which has substantially the same outer diameter as that of the outer barrel portion 157 of the stationary barrel 150 and is located in front of the outer barrel portion 157, a straight slot formation portion 192 which is formed to fit the outer circumferential surface of the intermediate barrel portion 153 of the stationary barrel 150, and a coupling portion 195 for coupling the operation ring portion 191 and the straight slot formation portion 192. A second lens group straight slot 193 extending in the direction parallel to the optical axis C and an inner gear 194 formed about the optical axis are formed on the straight slot formation portion 192. Although not shown, the inner gear 194 meshes with a gear driven by a focusing motor arranged in the camera main body.

The covering barrel 170 has a shielding barrel portion 171, the outer circumferential surface of which contacts the inner circumferential surface of the operation ring portion 191 of the focus operation ring 190 and the inner circumferential surface of which contacts the outer circumferential surface of the outer barrel portion 115 of the first lens group frame 110, and a coupling barrel portion 172 which is coupled to the shielding barrel portion 171 and is formed to be located between the outer and inner barrel portions 115 and 112 of the first lens group frame 110.

A cam barrel cam pin 105 is fixed to the cam barrel 160 to project radially outwardly. The cam barrel cam pin 105 is inserted in the cam barrel cam slot 155 of the intermediate barrel portion 153 located on the outer circumferential surface of the cam barrel 160, and in the cam barrel straight slot 183 of the inner barrel portion 182 of the zoom operation ring 180 located on the outer circumferential surface side of the intermediate barrel portion 153. For this reason, when a photographer rotates the zoom operation ring 180, the cam barrel cam pin 105 receives the rotational force from the zoom operation ring 180, and moves in the direction parallel to the optical axis C while rotating about the optical axis along the cam barrel cam slot 155 formed on the stationary barrel 150. As a result, the cam barrel 160 to which the cam barrel cam pin 105 is fixed also moves in the optical axis direction while rotating about the optical axis. A third lens group cam pin (Yth lens group cam pin) 103 is fixed to the barrel portion 133 of the third lens group frame 130 to project radially outwardly. The third lens group cam pin 103 is inserted in the fourth lens cam slot 144 located on the outer circumferential surface side of the barrel portion 133, in the third lens group cam slot 163 of the cam barrel 160 located on the outer circumferential surface side of the fourth lens group frame 140, and in the third lens group straight slot 154 of the stationary barrel 150 which is located on the outer circumferential surface side on the cam barrel 160. For this reason, when the cam barrel 160 rotates, and the third lens group cam slot 163 formed on the cam barrel 160 rotates, the third lens group cam pin 103 is about to move in the direction parallel to the optical axis C while rotating about the optical axis along the third lens group cam slot 163. However, since the third lens group cam pin 103 is also inserted in the straight slot 154 extending in the direction parallel to the optical axis C, its rotation about the optical axis is regulated by the straight slot 154, and the cam pin 103 moves in only the direction parallel to the optical axis C. As a result, the third lens group frame 130 to which the third lens group cam pin 103 is fixed moves in the optical axis direction without rotating about the optical axis.

A fourth lens group guide pin 104 is formed on the outer circumferential surface side of the barrel portion 142 of the fourth lens group frame 140 to project radially outwardly. The fourth lens group guide pin 104 is inserted in the fourth lens group cam slot 164 of the cam barrel 160 located on the outer circumferential surface side of the barrel portion 142. For this reason, when the cam barrel 160 rotates, the guide pin 104 and the fourth lens group frame 140 to which the guide pin 104 is fixed rotate about the optical axis upon reception of the rotational force from the cam barrel 160. The third lens group cam pin 103 which is fitted in the third lens group straight slot 154 of the stationary barrel 150 and cannot rotate about the optical axis is fitted in the fourth lens group cam slot 144 formed on the fourth lens group frame 140. For this reason, the fourth lens group frame 140 moves in the optical axis direction upon its own rotation.

As described above, the third lens group cam pin 103 moves in the direction parallel to the optical axis when the cam barrel 160 rotates about the optical axis. For this reason, the fourth lens group frame 140 which receives the third lens group cam pin 103 in its fourth lens group cam slot 144 moves in the optical axis direction upon movement of the third lens group cam pin 103 in the direction parallel to the optical axis C as well. More specifically, the movement, in the optical axis direction, of the fourth lens group frame 140 upon rotation of the cam barrel 160 corresponds to a combination of the movement caused by rotation of the fourth lens group frame 140 itself and the movement caused by the movement of the third lens group cam pin 103.

A first lens group cam pin 101 is fixed to the outer barrel portion 145 of the fourth lens group frame 140. The first lens group cam pin 101 is inserted in the first lens group cam slot 113 of the inner barrel portion 112 of the first lens group frame 110 which is located outside the outer barrel portion 145, and its distal end is fixed to the coupling barrel portion 172 of the covering barrel 170. A rotation regulation member 106 is fixed to the front end portion of the barrel portion 133 of the third lens group frame 130 which does not rotate about the optical axis. The rotation regulation member 106 is inserted in the first lens group straight slot 114 of the inner barrel portion 112 of the first lens group frame 110. For this reason, when the cam barrel 160 rotates, the fourth lens group frame 140 rotates about the optical axis together with the cam barrel 160, and the first lens group cam pin 101 fixed to the fourth lens group frame 140 rotates, the first lens group frame 110 is about to move in the optical axis direction while rotating about the optical axis. However, the first lens group frame 110 moves in only the optical axis direction since its rotation about the optical axis is regulated by the rotation regulation member 106.

As described above, the fourth lens group frame 140 moves in the optical axis direction while rotating about the optical axis when the cam barrel 160 rotates about the optical axis. Therefore, the movement of the first lens group frame 110 upon rotation of the cam barrel 160 corresponds to a combination of the movement caused by the rotation of the fourth lens group frame 140, and the movement caused by the movement, in the optical axis direction, of the fourth lens group frame 140. The covering barrel 170 moves in the optical axis direction while rotating about the optical axis together with the fourth lens group frame upon rotation, about the optical axis, and movement, in the optical axis direction, of the fourth lens group frame, since it is coupled to the fourth lens group frame 140 by the first lens group cam pin 101.

A second lens group cam pin 102 is fixed to the cam pin fixing portion 112 of the second lens group frame 120. This cam pin 102 is inserted in the second lens group cam slot 162 of the cam barrel 160 and the second lens group straight slot 193 of the focus operation ring 190. For this reason, when the cam barrel 160 rotates, and the second lens group cam slot 162 formed on the cam barrel 160 rotates, the second lens group cam pin 102 is about to move in the optical axis direction while rotating about the optical axis accordingly, but actually moves in only the direction parallel to the optical axis C since its rotation about the optical axis is regulated by the second lens group straight slot 193. As a result, when the cam barrel 10 160 rotates, the second lens group frame 120 to which the second lens group cam pin 102 is fixed moves in the optical axis direction without rotating about the optical axis. Since the rotation of the second lens group cam pin 102 about the optical axis upon rotation of the cam barrel 160 must be regulated, a given frictional force acts between the focus operation ring 190 and the stationary barrel 150 so as to prevent the focus operation ring 190 from rotating when the second lens group cam pin 102 is about to rotate about the optical axis. On the other hand, the second lens group frame 120 also moves in the optical axis direction upon rotation of the focus operation ring 190. More specifically, when the focus operation ring 190 is rotated by the photographer or the focusing motor, the second lens group cam pin 102 receives a rotational force from the second lens group straight slot 193 of the focus operation ring 190. Upon reception of the rotational force, this second lens group cam pin 102 moves in the direction parallel to the optical axis C while rotating about the optical axis along the second lens group cam slot 162 since it is also inserted in the cam slot 162 of the cam barrel 160. As a result, when the focus operation ring 190 rotates, the second lens group frame 120 to which the second lens group cam pin 102 is fixed moves in the optical axis direction while rotating about the optical axis. Note that the barrel portion 133 of the third lens group frame 130, the inner barrel portion 142 of the fourth lens group frame 140, and the intermediate barrel portion 153 of the stationary barrel 150 are arranged between the cam pin fixing portion 122 of the second lens group frame 120 and the straight slot formation portion 192 of the focus operation ring 190, which are coupled to each other by the second lens group cam pin 102, in addition to the cam barrel 160. For this reason, cam pin escape notches 134, 143, and 156 for escaping the second lens group cam pin 102 are respectively formed on the barrel portion 133 of the third lens group frame 130, the inner barrel portion 142 of the fourth group frame 140, and the intermediate barrel portion 153 of the stationary barrel 150, so that the third lens group frame 130, the fourth lens group frame 140, and the stationary barrel 150 are not influenced by the rotation, about the optical axis, and the movement, in the direction parallel to the optical axis C, of the second lens group cam pin 102.

Cylindrical collars are formed on the outer circumferential surfaces of the cam pins 101, 102, . . . , to improve the sliding characteristics with the cam slots 113, 162, . . .

In the above description, the arrangement of the zoom lens barrel of this embodiment and its local operations have been described. The operation of the overall zoom lens barrel of this embodiment will be described below.

When a photographer wants to set the photographing magnification to be a specific value, he or she operates the zoom operation ring 180 about the optical axis. Upon rotation of the zoom operation ring 180, as described above, a rotational force acts from the operation ring 180 onto the cam barrel cam pin 105, and the cam barrel cam pin 105 pares in the direction parallel to the optical axis C while rotating about the optical axis along the cam barrel cam slot 155 of the stationary barrel 150. Thus, the cam barrel 160 to which the cam barrel cam pin 105 is fixed also moves in the optical axis direction while rotating about the optical axis.

Figure 5:
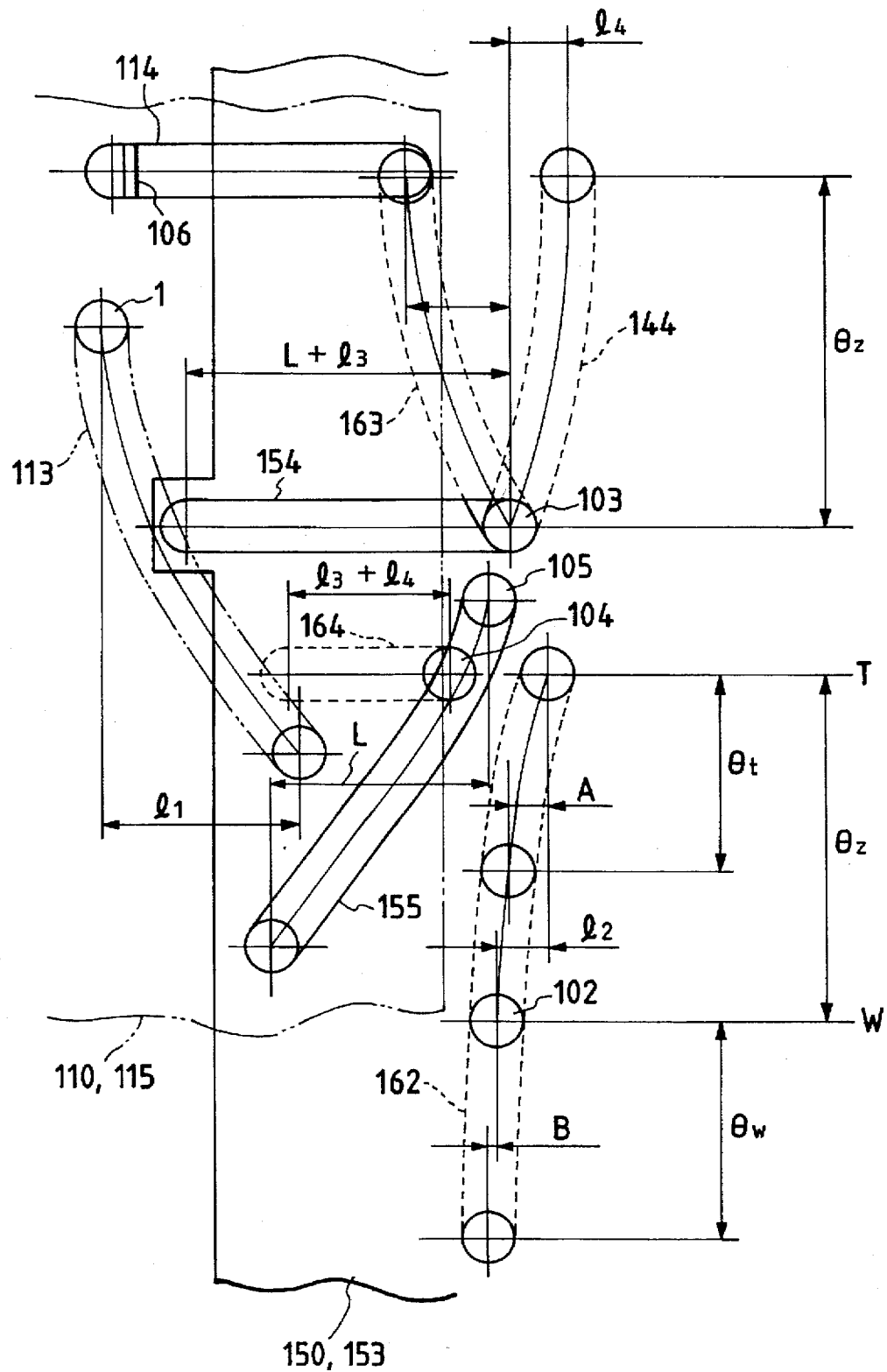
FIG. 5 is an explanatory view showing the relationship between the cam pins and cam slots according to the second embodiment of the present invention.

Let L be the maximum moving distance, in the optical axis direction, of the cam barrel 160, i.e., the length, in the direction parallel to the optical axis, of the cam barrel cam slot 155, as shown in FIG. 5. Also, let $l_1$, $l_2+B$, $l_3$, and $l_4$ respectively be the lengths, in the direction parallel to the optical axis C, of the first lens group cam slot 113, the second lens group cam slot 162, the third lens group cam slot 163, and the fourth lens group cam slot 164, as shown in FIG. 5. Note that $l_2$ is the length required upon rotation of the zoom operation ring 180, and B is the length required upon rotation of the focusing operation ring 190 (upon focusing at the wide-angle side).

When the cam barrel 160 rotates, as described above, the second lens group frame 120 moves in the optical axis direction upon rotation of the second lens group cam slot 162, and the third lens group frame 130 moves in the optical axis direction upon rotation of the third lens group cam slot 163. In this case, the maximum moving distances, in the optical axis direction, of the lens group frames 120 and 130 upon rotation of the cam barrel 160 are respectively the lengths $l_2$ and $l_3$, in the direction parallel to the optical axis, of the corresponding cam slots 162 and 163. In this case, precisely speaking, the maximum moving distance of the second lens group frame 120 is the length $l_2$ required for a zooming operation of the length ($l_2+B$), in the direction parallel to the optical axis C, of the second lens group cam slot 162.

When the cam barrel 160 rotates, as described above, the fourth lens group frame 140 makes movement as a combination of the movement in the optical axis direction upon rotation of the fourth lens group cam slot 144 upon rotation of the fourth lens group frame 140 itself and the movement in the optical axis direction upon movement, in the direction parallel to the optical axis C, of the third lens group cam pin 103. Therefore, the maximum moving distance, in the optical axis direction, of the fourth lens group frame 140 upon rotation of the cam barrel 160 is a sum $(l_3+l_4)$ of the maximum moving distance $l_4$ upon rotation of the fourth lens group cam slot 144 caused by the rotation of the fourth lens group frame 140 itself and the maximum moving distance $l_3$ (=the maximum moving distance of the third lens group frame 130 upon rotation of the cam barrel 160), in the direction parallel to the optical axis C, of the third lens group cam pin 103.

When the cam barrel 160 rotates, as described above, the first lens group 110 makes movement as a combination of the movement in the optical axis direction upon rotation of the first lens group cam pin 101 caused by the rotation of the fourth lens group frame 140, and the movement in the optical axis direction upon movement, in the optical axis direction, of the fourth lens group frame 140. Therefore, the maximum moving distance, in the optical axis direction, of the first lens group frame 110 upon rotation of the cam barrel 160 is a sum $(l_1+l_3+l_4)$ of the maximum moving distance $l_1$ upon rotation of the first lens group cam pin 101 caused by the rotation of the fourth lens group frame 140, and the maximum moving distance $(l_3+l_4$=the maximum moving distance of the fourth lens group frame 140 upon rotation of the cam barrel 160) in the optical axis direction upon movement, in the optical axis direction, of the fourth lens group frame 140.

Since the cam barrel 160 also moves in the optical axis direction upon rotation of the zoom operation ring 180, the moving distance, in the optical axis direction, of the cam barrel 160 is added to the moving distances of the lens group frames 110, 120, 130, and 140 upon rotation of the zoom operation ring 180. More specifically, the maximum moving distances of the lens group frames 110, 120, 130, and 140 upon rotation of the zoom operation ring 180 respectively correspond to sums of their maximum moving distances upon rotation of the cam barrel 160 and the maximum moving distance L, in the optical axis direction, of the cam barrel 160. Therefore, the maximum moving distance of the first lens group frame 110 is $(L+l_1+l_3+l_4)$, that of the second lens group frame 120 $(L-l_2)$, that of the third lens group frame 130 $(L+l_3)$, and that of the fourth lens group frame 140 $(L+l_3+l_4)$.

As described above, in this embodiment, the lens group frames 110, 120, 130, and 140 can assure moving amounts equal to or larger than the lengths, in the direction parallel to the optical axis C, of the corresponding cam slots 113, 162, 163, and 164 since their moving distances are determined as sums of their moving distances obtained upon rotation, about the optical axis, of the cam barrel 160 and the moving distance, in the optical axis direction, of the cam barrel 160. More specifically, the lens group frames 110, 120, 130, and 140 can assure moving amounts equal to or larger than the length, in the direction parallel to the optical axis C, of the cam barrel 160. In particular, the first lens group frame 110, which must have the largest moving amount, can assure a very large moving amount since its moving distance is determined as a sum of the moving distance $l_1$ upon rotation of the first lens group cam pin 101, the moving distance $(l_3+l_4)$, in the optical axis direction, of the fourth lens group frame 140, and the moving distance L, in the optical axis direction, of the cam barrel 160, upon rotation, about the optical axis, of the cam barrel 160. Therefore, a large zoom amount can be assured without increasing the barrel length in the direction parallel to the optical axis C.

In the relationship between the cam pin and the cam slot, if the cam slot rotates about the optical axis, the movement of the cam pin must be regulated, so that the cam pin moves in the direction parallel to the optical axis C without rotating about the optical axis. In this embodiment, as for the second, third, and fourth lens groups L2, L3, and L4 having relatively small maximum moving distances, a straight movement of the cam pin 103 upon rotation of the cam slot 163 is assured by forming the third lens group straight slot 154 on the stationary barrel 150 and inserting the third lens group cam pin 103 in the straight slot 154. However, if the straight slot formed on the stationary barrel 150 is utilized for the first lens group L1 having the largest maximum moving amount in the optical axis direction of the respective lens groups, the length, in the optical axis direction, of the stationary barrel 150 undesirably increases. Thus, as for the first lens group L1, in this embodiment, the straight slot 114 and the rotation regulation member 106 fitted in the straight slot 114 are respectively provided to the first and third lens group frames 110 and 130 which move in the optical axis direction and in the same direction although they have different moving distances in the optical axis direction, and the absolute required length of the straight slot is substantially reduced by movement of the frames 110 and thereby making the lens barrel compact. More specifically, the first lens group straight slot 114 is formed on the first lens group frame 110, and the rotation regulation member 106 fitted in the straight slot 114 is formed on the third lens group frame 130 which moves in the optical axis direction upon movement of the first lens group frame 110 but does not rotate about the optical axis, thereby assuring a straight movement of the cam pin 101 relative to the first lens group cam slot 113, in this case, a straight movement of the cam slot 113 upon rotation of the cam pin 101.

In this embodiment, since the first lens group frame 110 has a large moving amount, as described above, the focus operation ring 190 or the stationary barrel 150 must be prolonged in the optical axis direction so as not to form a gap between the first lens group frame 110 and the focus operation ring 190, which neighbors the first lens group frame 110 and does not move in the optical axis direction, of members constituting the lens barrel in a state wherein the first lens group frame 110 is located at the frontmost position (telephoto end). However, this increases the size of the lens barrel. In order to solve this problem, in this embodiment, the covering barrel 170 is inserted between the first lens group frame 110 and the focus operation ring 190, and the covering barrel 170 is moved by the fourth lens group frame 140 which moves upon movement of the first lens group frame 110, thereby covering the gap between the first lens group frame 110 and the focus operation ring 190. More specifically, when the first lens group frame 110 and the focus operation ring 190 overlap each other in a state wherein the first lens group frame 110 is located at the rearmost position (wide-angle end shown in FIG. 4), the covering barrel 170 is arranged to overlap the focus operation ring 190. The covering barrel 170 is coupled to the fourth lens group frame 140 by the first lens group cam pin 101, and moves in the optical axis direction together with the fourth lens group frame 140 upon movement of the first lens group frame 110. In this embodiment, the covering barrel 170 and the fourth lens group frame 140 are coupled to each other. However, any other structures may be adopted as long as the covering barrel 170 can be moved upon movement of the first lens group frame 110. For example, the covering barrel 170 and the third lens group frame 130 may be coupled to each other by the rotation regulation member 106, and the covering barrel 170 may move together with the third lens group frame 130. In this embodiment, since the second lens group frame 120 moves independently in a focusing operation unlike other lens group frames, it is not preferable to couple the covering barrel 170 and the second lens group frame 120. When the first lens group frame 110 overlaps the focus operation ring 190 at the wide-angle end shown in FIG. 4, the covering barrel 170 completely overlaps the focus operation ring 190, as described above. When the zoom operation ring 180 is rotated, the first lens group frame 110 moves forward, and a gap is formed between a rear edge 115a of the first lens group frame 110 and a front edge 191a of the focus operation ring 190, the covering frame 170 also moves upon movement of the first lens group frame 110. This is because the first lens group frame 140 which moves upon movement of the first lens group frame 110, and the covering barrel 170 are coupled to each other via the first lens group cam pin 101. Upon movement of the covering barrel 170, the gap between the rear edge 115a of the first lens group frame 110 and the front edge 191a of the focus operation ring 190 is covered. When no covering barrel 170 is arranged, the focus operation ring 190 or the stationary barrel 150 must be prolonged by the length, in the optical axis direction, of the covering barrel 170, as described above. However, in this embodiment, when a gap is formed between the rear edge 115a of the first lens group frame 110 and the front edge 191a of the focus operation ring 190 upon movement of the first lens group frame 110, the covering barrel 170, which has completely overlapped the focus operation ring 190 at the wide-angle end, moves accordingly, and covers this gap. For this reason, the focus operation ring 190 or the stationary barrel 150 need not be prolonged in the optical axis direction to cover this gap, and an increase in size of the lens barrel can be prevented.

When the photographer obtains the target photographing magnification by rotating the zoom operation ring 180, he or she rotates the focus operation ring 190 to perform a focusing operation. Note that the focus operation ring 190 may be manually rotated, but may be rotated by driving the focusing motor arranged in the camera main body. Upon rotation of the focus operation ring 190, as described above, the second lens group cam pin 102 receives the rotational force from the second lens group straight slot 193 of the focus operation ring 190. This cam pin 102 moves in the direction parallel to the optical axis C while rotating about the optical axis upon reception of the rotational force from the focus operation ring 190 since it is inserted in the second lens group cam slot 162 of the cam barrel 160. Therefore, the second lens group frame 120 to which the cam pin 102 is fixed also moves in the optical axis direction while rotating about the optical axis.

The second lens group cam pin 102 and the second lens group cam slot 162 operate not only in the zooming mode but also in the focusing mode. Thus, the relationship between the second lens group cam pin 102 and the second lens group cam slot 162 in the zooming and focusing modes will be briefly described below with reference to FIG. 5.

If the rotation angle of the zoom operation ring 180 is θz, the rotation angle of the second lens group cam pin 102 relative to the second lens group cam slot 162 is also θz. The moving Mount, in the direction parallel to the optical axis C, of the second lens group cam pin 102 at that time is $l_2$. The moving amount, in the optical axis direction, of the second lens group L2 required for focusing at the telephoto side is A ($<l_2$) in a direction from the telephoto end, T, toward the wide-angle end, W. On the other hand, the moving amount, in the optical axis direction, of the second lens group L2 required for focusing at the wide-angle side is B in the farther direction, from the wide-angle end W to the telephoto end T. Therefore, the moving range of the cam pin 102 upon focusing at the telephoto side falls within the moving range of the cam pin 102 upon rotation of the zoom operation ring 180, but the moving range of the cam pin 102 upon focusing at the wide-angle side falls outside the moving range of the cam pin 102 upon rotation of the zoom operation ring 180. For this reason, the length, in the direction parallel to the optical axis C, of the second lens group cam slot 162 corresponds to a sum of the length $l_2$ required upon rotation of the zoom operation ring 180, and the length B required upon rotation of the focus operation ring 190 at the wide-angle side. In this embodiment, the moving amount B, in the optical axis direction, of the second lens group L2 required for focusing at the wide-angle side is different from its moving amount A at the telephoto side. However, in order to improve the operation feeling of the focus operation ring 190, the second lens group cam slot 162 is shaped so that the relative rotation angle, θw, of the cam pin 102 required for focusing at the wide-angle side is equal to its relative rotation angle θt at the telephoto side.

In the zoom lens barrel of this embodiment, since the fourth lens group frame moves in the optical axis direction while rotating about the optical axis, and the first lens group frame moves not only by a distance obtained upon rotation of the fourth lens group frame but also by a distance upon movement, in the optical axis direction, of the fourth lens group frame, the moving amount of the lens, i.e., the zoom amount can be increased without increasing the size of the lens barrel itself.

The third embodiment of a zoom lens barrel according to the present invention will be described below with reference to FIGS. 6 to 8.

The zoom lens barrel of this embodiment incorporates a plurality of lens groups and is attached to a camera main body. In the following description, the camera main body side will be referred to as a rear side and the object side will be referred to as a front side for the sake of descriptive convenience.

Figure 6:
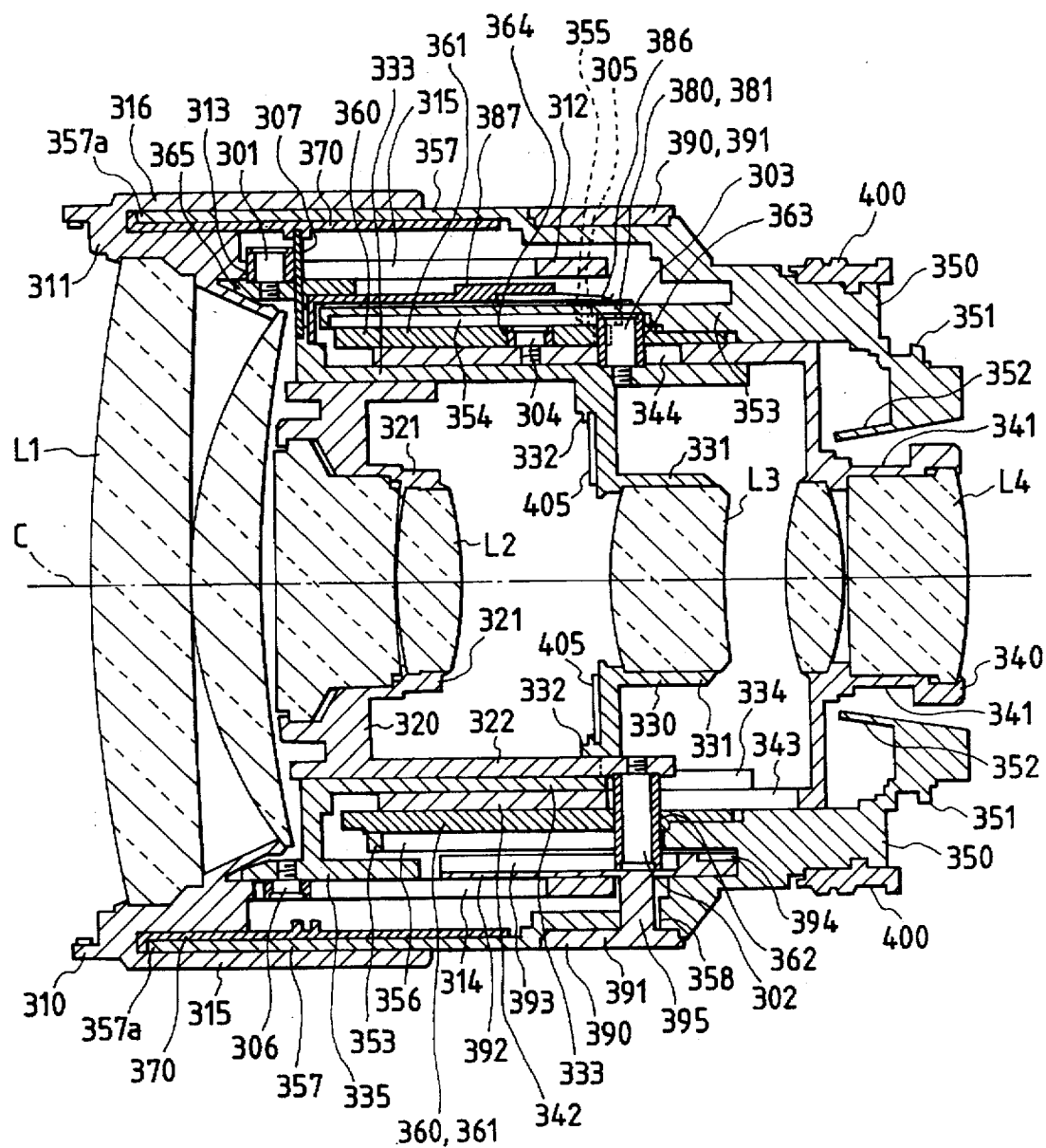
FIG. 6 is a sectional view (wide-angle end) of a zoom lens barrel according to the third embodiment of the present invention.

In this embodiment, the lens groups include, in turn from the front side, a first lens group L1, a second lens group L2, a third lens group (Xth lens group) L3, and a fourth lens group L4, as shown in FIG. 6.

As shown in FIG. 6, the zoom lens barrel of this embodiment comprises a first lens group frame 310 for holding the first lens group L1, a second lens group frame 320 for holding the second lens group L2, a third lens group frame (Xth lens group frame) 330 for holding the third lens group L3, a fourth lens group frame 340 for holding the fourth lens group L4, a stationary barrel 350 fixed to the camera main body (not shown), a cam barrel 360 on which a plurality of cam slots 362, 363, and 364 are formed, a focus operation ring 390 used for performing a focusing operation, a covering barrel 370 for covering any gap between the first lens group frame 310 and the focus operation ring 190 upon movement of the first lens group frame 310, a flexible printed board 380 and a brush 386 used for detecting the zoom amount (synthesized focal length), an aperture operation ring 400 for performing an aperture operation, and an aperture mechanism 405 for adjusting the amount of light guided into the camera body in synchronism with the rotation of the aperture operation ring 400.

The stationary barrel 350 has a mount portion 351 attached to the camera main body, an inner barrel portion 352 which extends forward from the mount portion 351 and has a cylindrical shape having an optical axis C as its center, an intermediate barrel portion 353 which extends forward from the mount portion 351 and has a cylindrical shape having an optical axis C as its center, and an outer barrel portion 357 which extends forward from the mount portion 351 and has a cylindrical shape having an optical axis C as its center. A focus operation ring through hole 358 is formed on the outer barrel portion 357 of the stationary barrel 350. The through hole 358 extends through the outer barrel portion 357 from its inner to outer circumferential surface side, and extends in a direction about the optical axis. Also, a cam barrel cam slot 355 is formed on the intermediate barrel portion 353 of the stationary barrel 350. The cam slot 355 extends through the intermediate barrel portion 353 from its inner to outer circumferential surface side, and has a spiral shape about the optical axis. Furthermore, a third lens group straight slot (Xth lens group straight slot) 354 is formed on the inner circumferential surface side of the intermediate barrel portion 353 to extend in a direction parallel to the optical axis C.

The cam barrel 360 has a cam slot formation barrel portion 361 which is formed into a cylindrical shape to fit the inner circumferential surface of the intermediate barrel portion 353 of the stationary barrel 350, and a cam pin fixing portion 365 formed to extend from the front edge of the intermediate barrel portion 353 of the stationary barrel 350 on its outer circumferential surface side. A second lens group cam slot 362, a third lens group cam slot (Xth lens group cam slot) 363, and a fourth lens group cam slot 364 are formed on the cam slot formation barrel portion 361 of the cam barrel 360. These cam slots extend through the cam slot formation barrel portion 361 from its inner to outer circumferential surface side and have a spiral shape about the optical axis.

The fourth lens group frame 340 has a lens frame portion 341 which holds the fourth lens group L4, and is formed into a cylindrical shape to fit the inner circumferential surface of the inner barrel portion 352 of the stationary barrel 350, and a barrel portion 342 which extends forward from the lens frame portion 341 and is formed into a cylindrical shape to fit the inner circumferential surface of the cam barrel 360.

The third lens group frame 330 has a lens frame portion 331 for holding the third lens group L3, an aperture mechanism mount portion 332 provided with the aperture mechanism 405, a barrel portion 333 which is formed into a cylindrical shape to be located on the outer circumferential surface side of these portions, and to fit the inner circumferential surface of the inner barrel portion 342 of the fourth lens group frame 340, and a rotation regulation pin fixing portion 335 extending from the barrel portion 333 in the direction parallel to the optical axis C.

The second lens group frame 320 has a lens frame portion 321 for holding the second lens group L2, and a cam pin fixing portion 322 which fits the inner circumferential surface of the barrel portion 333 of the third lens group frame 330 and extends backward from the lens frame portion 321.

The first lens group frame 310 has a lens frame portion 311 for holding the first lens group L1, an inner barrel portion 312 which extends backward from this lens frame portion 311 and has a cylindrical shape having the optical axis C as its center, and an outer barrel portion 316 which extends backward from this lens frame portion 311 and has a cylindrical shape to fit the outer circumferential surface of the outer barrel portion 357 of the stationary barrel 350. The inner barrel portion 312 of the first lens group frame 310 is located between the outer and intermediate barrel portions 357 and 353 of the stationary barrel 350. A first lens group cam slot 313 and a first lens group straight slot 314 are formed on the inner barrel portion 312 of the first lens group frame 310. The first lens group cam slot 313 extends through the inner barrel portion 312 from its inner to outer circumferential surface side and has a spiral shape about the optical axis. The first lens group straight slot 314 extends through inner barrel portion 312 from its inner to outer circumferential surface side, and extends in the direction parallel to the optical axis C. The outer barrel portion 316 of the first lens group frame 310 serves as a zoom operation portion which is operated by a photographer in a zooming operation.

The focus operation ring 390 has an operation ring portion 391 which is formed into a cylindrical shape to fit the outer circumferential surface of the outer barrel portion 357 of the stationary barrel 350, a straight slot formation portion 392 which is formed to fit the outer circumferential surface of the intermediate barrel portion 353 of the stationary barrel 350, and a coupling portion 395 which extends through the focus operation ring through hole 358 of the stationary barrel 350 to couple the operation ring portion 391 and the straight slot formation portion 392 to each other. A second lens group straight slot 393 extending in the direction parallel to the optical axis C and an inner gear 394 formed about the optical axis are formed on the straight slot formation portion 392. Although not shown, the inner gear 394 meshes with a gear driven by a focusing motor arranged in the camera main body.

The covering barrel 370 is formed into a cylindrical shape to fit the inner circumferential surface of the outer barrel portion 357 of the stationary barrel 350.

A first lens group cam pin 301 is fixed to the cam pin fixing portion 365 of the cam barrel 360. The first lens group cam pin 301 is inserted in the first lens group cam slot 313 of the inner barrel portion 312 of the first lens group frame 310 which is located outside the outer barrel portion 365. As will be described later, a rotation regulation pin 306 is fixed to the rotation regulation pin fixing portion 335 of the third lens group frame 330 which does not rotate about the optical axis. The rotation regulation pin 306 is inserted in the first lens group straight slot 314 of the inner barrel portion 312 of the first lens group frame 310. For this reason, when a force in the optical axis direction is applied to the first lens group frame 310, the first lens group frame 310 moves in the optical axis direction while rotating about the optical axis relative to the first lens group cam pin 301 fitted in the first lens group cam slot 313. However, the first lens group frame 310 moves in only the optical axis direction since its rotation amount optical axis is regulated by the rotation regulation pin 306, and instead, the first lens group cam pin 301 and the cam barrel 360 to which the cam pin 301 is fixed rotate about the optical axis.

A cam barrel cam pin 305 is fixed to the cam slot formation barrel portion 361 of the cam barrel 360 to project radially outwardly. The cam barrel cam pin 305 is inserted in the cam barrel cam slot 355 of the intermediate barrel portion 353 of the stationary barrel 350, which is located on the outer circumferential surface side of the cam slot formation barrel portion 361. For this reason, when the cam barrel 360 rotates, and a rotational force about the optical axis acts on the cam barrel cam pin 305, the cam barrel cam pin 305 moves in the direction parallel to the optical axis C while rotating about the optical axis along the cam barrel cam slot 355 formed on the stationary barrel 350. As a result, the cam barrel 360 to which the cam barrel cam pin 305 is fixed also moves in the optical axis direction while rotating about the optical axis.

A third lens group cam pin (Xth lens group cam pin) 303 is fixed to the barrel portion 333 of the third lens group frame 330 to project radially outwardly. The third lens group cam pin 303 is inserted in the third lens group cam slot 363 of the cam barrel 360, which is located on the outer circumferential surface side of the barrel portion 333, and in the third lens group straight slot 354 of the stationary barrel 350, which is located on the outer circumferential surface side of the cam barrel 360. For this reason, when the cam barrel 360 rotates, and the third lens group cam slot 363 formed on the cam barrel 360 rotates, the third lens group cam pin 303 is about to move in the direction parallel to the optical axis C while rotating about the optical axis along the cam slot 363. However, since the third lens group cam pin 303 is inserted in the straight slot 354 extending in the direction parallel to the optical axis C, and its movement about the optical axis is regulated by the straight slot 354, the cam pin 303 moves in only the direction parallel to the optical axis C. As a result, upon rotation of the cam barrel 360, the third lens group frame 330 to which the third lens group cam pin 303 is fixed moves in the optical axis direction without rotating about the optical axis. Since the barrel portion 342 of the fourth lens group frame 340 is located between the intermediate barrel portion 353 of the stationary barrel 350 and the barrel portion 333 of the third lens group frame 330, which are coupled to each other by the third lens group cam pin 303, in addition to the cam slot formation barrel portion 361 of the stationary barrel 350, a cam pin escape hole 344 through which the third lens group cam pin 303 extends, and which is elongated in the direction parallel to the optical axis C, is formed on the barrel portion 342 of the fourth lens group frame 340, so as to prevent the fourth lens group frame 340 from moving upon movement of the third lens group cam pin 303. One end portion of a covering barrel coupling member 307 is fixed to the distal end portion of the third lens group frame 330. The other end portion of the covering barrel coupling portion 307 is fixed to the covering barrel 370. Therefore, when the third lens group frame 330 moves in the optical axis direction, the covering barrel 370 moves in the optical axis direction together with the frame 330. Since the inner barrel portion 312 of the first lens group frame 310 is located between the covering barrel 370 and the cam slot formation barrel portion 361 of the cam barrel 360, which are coupled to each other by the covering barrel coupling member 307, a coupling member escape hole 315 which is elongated in the direction parallel to the optical axis C is formed on the inner barrel portion 312 of the first lens group frame 310 so as not to disturb the movement of the covering barrel coupling member 307 upon movement of the third lens group frame 330. FIG. 6 illustrates the covering barrel coupling member 307 as if it extended through the cam pin fixing portion 365 of the cam barrel 360 for the sake of convenience. However, in practice, since the positions of the cam pin fixing portion 365 of the cam barrel 360 and the covering barrel coupling member 307 about the optical axis are different from each other, the cam pin fixing portion 365 of the cam barrel 360 does not disturb the movement of the covering barrel coupling member 307.

A fourth lens group cam pin 304 is fixed on the outer circumferential surface side of the barrel portion 342 of the fourth lens group frame 340 to project radially outwardly. The fourth lens group cam pin 304 is inserted in the fourth lens group cam slot 364 of the cam barrel 360, which is located on the outer circumferential surface side of the barrel portion 342. For this reason, when the cam barrel 360 rotates, and the fourth lens group cam slot 364 formed on the cam barrel 360 rotates, the fourth lens group cam pin 304 is about to move in the direction parallel to the optical axis C while rotating about the optical axis along the cam slot 364. For this reason, the fourth lens group frame 340 formed with the fourth lens group cam pin 304 is also about to move in the optical axis direction while rotating about the optical axis. However, since the third lens group cam pin 303 which moves in only the direction parallel to the optical axis C is inserted in the cam pin escape hole 344 extending in the direction parallel to the optical axis C, the fourth lens group frame 340 cannot rotate about the optical axis. Therefore, the fourth lens group frame 340 moves in the optical axis direction without rotating about the optical axis when the cam barrel 360 rotates.

A second lens group cam pin 302 is fixed to the cam pin fixing portion 322 of the second lens group frame 320. The cam pin 302 is inserted in the second lens cam slot 362 of the cam barrel 360 and the second lens group straight slot 393 of the focus operation ring 390. For this reason, when the cam barrel 360 rotates, and the second lens group cam slot 362 formed on the cam barrel 360 rotates, the second lens group cam pin 302 is about to move in the optical axis direction while rotating about the optical axis accordingly, but actually moves in only the direction parallel to the optical axis since its movement about the optical axis is regulated by the second lens group straight slot 393. As a result, when the cam barrel 360 rotates, the second lens group frame 320 to which the second lens group cam pin 302 is fixed moves in the optical axis direction without rotating about the optical axis. Since the rotation of the second lens group cam pin 302 about the optical axis upon rotation of the cam barrel 360 must be regulated, a given frictional force acts between the focus operation ring 390 and the stationary barrel 350 so as to prevent the focus operation ring 390 from rotating when the second lens group cam pin 302 is about to rotate about the optical axis. On the other hand, the second lens group frame 320 also moves in the optical axis direction upon rotation of the focus operation ring 390. More specifically, when the focus operation ring 390 is rotated by the photographer or the focusing motor, the second lens group cam pin 302 receives a rotational force from the second lens group straight slot 393 of the focus operation ring 390. Upon reception of the rotational force, this second lens group cam pin 302 moves in the direction parallel to the optical axis C while rotating about the optical axis along the second lens group cam slot 362 since it is also inserted in the cam slot 362 of the cam barrel 360. As a result, when the focus operation ring 390 rotates, the second lens group frame 320 to which the second lens group cam pin 302 is fixed moves in the optical axis direction while rotating about the optical axis. Note that the inner barrel portion 342 of the fourth lens group frame 340 and the intermediate barrel portion 353 of the stationary barrel 350 are arranged between the cam pin fixing portion 322 of the second lens group frame 320 and the straight slot formation portion 392 of the focus operation ring 390, which are coupled to each other by the second lens group cam pin 302, in addition to the cam slot formation barrel portion 361 of the cam barrel 360. For this reason, cam pin escape notches 334, 343, and 356 for escaping the second lens group cam pin 302 are respectively formed on the barrel portion 333 of the third lens group frame 330, the barrel portion 342 of the fourth group frame 340, and the intermediate barrel portion 353 of the stationary barrel 350, so that the third lens group frame 330, the fourth lens group frame 340, and the stationary barrel 350 are not influenced by the rotation, about the optical axis, and the movement, in the direction parallel to the optical axis C, of the second lens group cam pin 302.

Cylindrical collars are formed on the outer circumferential surfaces of the cam pins 301, 302, . . . , to improve the sliding characteristics with the cam slots 313, 362, . . .

The flexible printed board 380 is adhered to the outer circumferential surface of the intermediate barrel portion 353 of the stationary barrel 350. As shown in FIG. 8, the flexible printed board 380 has a printed board main body 380a, a conductor pattern 381a–381d printed thereon, a microcomputer (zoom position detection unit) 384 for executing various arithmetic operations, and mount terminals 385 for communicating the calculation results of the microcomputer 384 with the camera main body. The conductor pattern 381 is formed by a plurality of conductors, and has four columns 381a to 381d parallel to the optical axis C. On the respective columns 381a to 381d, conductive portions 382a to 382d having conductors and non-conductive portions 383b to 383d having no conductors are alternately formed in the direction parallel to the optical axis.

A brush mount portion 387 is fixed to the front edge portion of the third lens group frame 330. The brush 386 is fixed to this brush mount portion 387, so that its distal end portion contacts the conductor pattern 381. The brush 386 has four brush portions (386a to 386d) in correspondence with the four columns 381a to 381d of conductor patterns.

In the above description, the arrangement of the zoom lens barrel of this embodiment and its local operations have been described. The operation of the overall zoom lens barrel of this embodiment will be described below.

Figure 7:
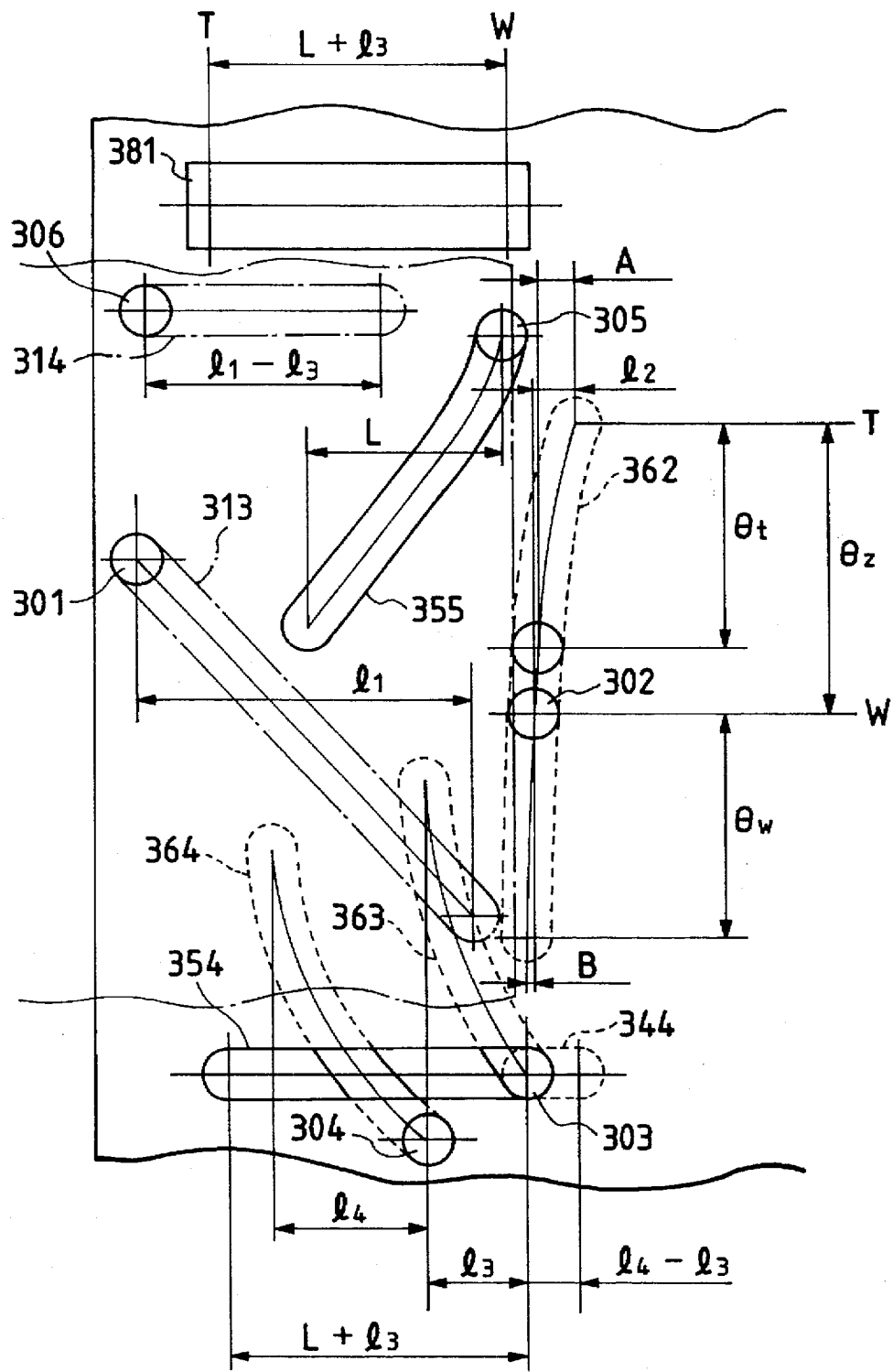
FIG. 7 is an explanatory view showing the relationship between the cam pins and cam slots according to the third embodiment of the present invention.

Prior to the description of the operation of the overall zoom lens barrel, for the sake of convenience in the following description, let $l_1$, $l_2+B$, $l_3$, $l_4$, and L respectively be the lengths, in the direction parallel to the optical axis C, of the first lens group cam slot 313, the second lens group cam slot 362, the third lens group cam slot 363, the fourth lens group cam slot 364, and the cam barrel cam slot 355, as shown in FIG. 7. Note that $l_2$ is the length required upon extension of the first lens group frame 310 in the optical axis direction (zooming operation), and B is the length required upon rotation of the focus operation ring 390 (upon focusing at the wide-angle side).

When a photographer wants to set the photographing magnification to be a specific value, he or she holds the outer barrel portion (zoom operation portion) of the first lens group frame 310 and applies a force in the optical axis direction thereto. Upon application of the force in the optical axis direction to the first lens group frame 310, as described above, the first lens group frame 310 moves in the optical axis direction while rotating in the optical axis direction relative to the first lens group cam pin 301 fitted in the first lens group cam slot 313. However, the first lens group frame 310 moves in only the optical axis direction since its rotation about the optical axis is regulated by the rotation regulation pin 306, and instead, the first lens group cam pin 301 and the cam barrel to which the cam pin 301 is fixed rotate about the optical axis. In this case, the maximum moving distance, in the optical axis direction, of the first lens group frame 310 with respect to the cam barrel 360 coincides with the length $l_1$, in the direction parallel to the optical axis C, of the first lens group cam slot 313.

When the cam barrel 360 rotates, and a rotational force about the optical axis acts on the cam barrel cam pin 305, as described above, the cam barrel cam pin 305 moves in the direction parallel to the optical axis C while rotating about the optical axis along the cam barrel cam slot 355 formed on the stationary barrel 350. As a result, the cam barrel 360 to which the cam barrel cam pin 305 is fixed also moves in the optical axis direction while rotating about the optical axis. In this case, the maximum moving distance, in the optical axis direction, of the cam barrel 360 with respect to the stationary barrel 350 coincides with the length L, in the direction parallel to the optical axis, of the cam barrel cam slot 355.

When the cam barrel 360 moves in the optical axis direction, the first lens group frame 310 is pushed by the first lens group cam pin 301 and moves in the optical axis direction accordingly. Therefore, the maximum moving distance, in the optical axis direction, of the first lens group frame 310 with respect to the stationary barrel 350 corresponds to a sum of the maximum moving distance $l_1$ of the first lens group frame 310 with respect to the cam barrel 360, and the maximum moving distance L of the cam barrel 360 with respect to the stationary barrel 350.

When the cam barrel 360 rotates, as described above, the second lens group frame 320 moves in the optical axis direction upon rotation of the second lens group cam slot 362, the third lens group frame 330 moves in the optical axis direction upon rotation of the third lens group cam slot 363, and the fourth lens group frame 340 moves in the optical axis direction upon rotation of the fourth lens group cam slot 364. In this case, the maximum moving distances, in the optical axis direction, of the lens group frames 320, 330, and 340 upon rotation of the cam barrel 360 are respectively equal to the lengths $l_2$, $l_3$, and $l_4$, in the direction parallel to the optical axis, of the corresponding cam slots 362, 363, and 364. In this case, as for the second lens group frame 320, strictly speaking, the length $l_2$ required for a zooming operation of the length ($l_2+B$), in the direction parallel to the optical axis C, of the second lens group cam slot 362 corresponds to the maximum moving distance. Since the cam barrel 360 moves in the optical axis direction upon movement, in the optical axis direction, of the first lens group frame 310, the moving distance, in the optical axis direction, of the cam barrel 360 is added to the moving distances of the lens group frames 320, 330, and 340 upon movement, in the optical axis direction, of the first lens group frame 310. More specifically, the maximum moving distances of the lens group frames 320, 330, and 340 upon movement, in the optical axis direction, of the first lens group frame 310 correspond to sums of their maximum moving distances upon rotation of the cam barrel 360 and the maximum moving distance L, in the optical axis direction, of the cam barrel 360. Therefore, the maximum moving distance of the second lens group frame 320 is ($L-l_2$), that of the third lens group frame 330 ($L+l_3$), and that of the fourth lens group frame 340 ($L+l_4$).

As described above, in this embodiment, since the moving distances of the lens group frames 310, 320, 330, and 340 are determined by the moving distance L, in the optical axis direction, of the cam barrel 360 in addition to those obtained upon rotation, about the optical axis, of the cam barrel 360, moving amounts equal to or larger than the lengths, in the direction parallel to the optical axis C, of the cam slots 313, 362, 363, and 364 can be assured. More specifically, the respective lens group frames 310, 320, 330, and 340 can assure moving amounts equal to or larger than the length, in the direction parallel to the optical axis C, of the cam barrel 360. Therefore, a large zoom amount can be assured without increasing the barrel length in the direction parallel to the optical axis C.

In general, the zoom amount (=the synthesized focal length of the respective lens groups) is detected by detecting the rotation amount of the zoom operation ring or the cam barrel. However, since this embodiment attains a zooming operation by moving the first lens group frame 310 in the optical axis direction, and has no zoom operation ring, the zoom amount cannot be detected based on the rotation amount of the zoom operation ring. In this embodiment, since the cam barrel 360 moves in the optical axis direction while rotating about the optical axis, an encoder for detecting the rotation amount of the cam barrel 360 is complicated. When the moving amount, in the optical axis direction, of the first lens group frame 310 serving as an operation end in a zooming operation is to be detected, since the moving amount of the first lens group frame 310 is large, the encoder is prolonged, and the size of the lens barrel undesirably increases. Thus, in this embodiment, the zoom amount is detected by detecting the moving amount, in the optical axis direction, of the third lens group frame 310 which moves in the optical axis direction upon movement of the first lens group frame 310 but has a considerably smaller moving amount than that of the first lens group frame 310.

Detection of the zoom amount of this embodiment will be described in detail below.

The microcomputer 384 on the printed board main body 380a applies a voltage to the conductor pattern 381a–381d. On the other hand, the brush 386 contacting the conductor pattern 381a–381d is grounded. When the brush 386 fixed to the third lens group frame 330 via the brush mount portion 387 moves in the optical axis direction relative to the printed board 380 adhered to the stationary barrel 350, it contacts one of the conductive portion 382a–382d or the non-conductive portion 383a–383d of the conductor pattern 381a–381d. When the brush 386 contacts the conductive portion 382a–382d of the conductor pattern 381, since the brush 386 is grounded, the potential of the conductor pattern 381a–381d lowers (Low); when the brush 386 contacts the non-conductive portion 383 of the conductor pattern 381a–381d, the potential of the conductor pattern 381a–381d is maintained (High). The four columns 381a to 381d are parallel to the optical axis C, with the columns being are set at Low or High levels. For this reason, based on various combinations of Low and High levels, the microcomputer 384 can detect the positional relationship, in the optical axis direction of the third lens group frame 330 relative to the stationary barrel 350. The third lens group frame 330 moves in the optical axis direction together with other lens group frames 320 and 340 upon movement, in the optical axis direction, of the first lens group frame 310. Therefore, the moving distance, in the optical axis direction, of the third lens group frame 330 has a predetermination correlation with those, in the optical axis direction, of other lens group frames 310, 320, and 330. Thus, the microcomputer 384 recognizes the moving distances of the lens group frames 310, 320, and 340 based on the moving distance of the third lens group frame 330, thereby detecting the zoom amount. The zoom amount detected by the microcomputer 384 is transmitted from the mount terminals 385 to the camera main body.

As described above, in this embodiment, since the zoom amount is detected based on the moving distance, in the optical axis direction, of the third lens group 330, which is much smaller than that of the first lens group frame 310, the length, in the optical axis direction, of the conductor pattern 381a–381d can be shortened, and consequently, the lens barrel can be made compact.

In this embodiment, the conductor pattern 381a–381d is provided to the third lens group frame 330. Alternatively, the conductor pattern 381a–381d may be provided to other lens group frames having a smaller moving distance than that of the first lens group frame 310, e.g., the fourth lens group frame 340. In this embodiment, since the second lens group frame 320 moves in the optical axis direction not only by the zooming operation but also by the focusing operation, it is not preferable to provide the conductor pattern to the second lens group frame 320. In this embodiment, the conductor pattern 381a–381d is arranged on the stationary barrel 350, and the brush 386 is arranged on the lens group frame 330. Conversely, the brush 386 may be arranged on the stationary barrel 350, and the conductor pattern 381a–381d may be arranged on the lens group frame 330. In this case as well, it is preferable in terms of communications with the camera main body that the microcomputer 384 be provided to the stationary barrel 350 so as to detect the moving distance of the lens group frame 330 based on combinations of High and Low levels of the brush 386.

In the relationship between the cam pin and the cam slot, if the cam slot rotates about the optical axis, the movement of the cam pin must be regulated, so that the cam pin moves in the direction parallel to the optical axis C without rotating about the optical axis. In this embodiment, as for the second, third, and fourth lens groups L2, L3, and L4 having relatively small maximum moving distances, a straight movement of the cam pin 303 upon rotation of the cam slot 363 is assured by forming the third lens group straight slot 354 on the stationary barrel 350 and inserting the third lens group cam pin 303 in the straight slot 354. However, when the straight slot formed on the stationary barrel 350 is also utilized for the first lens group L1 having the largest maximum moving amount in the optical axis direction of the respective lens groups, the length, in the optical axis direction, of the stationary barrel 350 increases. Thus, as for the first lens group L1, in this embodiment, the straight slot 314 and the rotation regulation pin 306 fitted in the straight slot 314 are respectively provided to the first and third lens group frames 310 and 330 which move in the optical axis direction and in the same direction although they have different moving distances in the optical axis direction, and the absolute required length of the straight slot is substantially reduced by movement of the frames 310 and 330, thereby making the lens barrel compact. More specifically, the first lens group straight slot 314 is formed on the first lens group frame 310, and the rotation regulation pin 306 fitted in the straight slot 314 is formed on the third lens group frame 330 which moves in the optical axis direction upon movement of the first lens group frame 310 but does not rotate about the optical axis, thereby assuring a straight movement of the cam pin 301 relative to the first lens group cam slot 313, in this case, a straight movement of the cam slot 313 upon rotation of the cam pin 301.

In this embodiment, since the first lens group frame 310 has a large moving amount, the outer barrel portion 316 of the first lens group frame 310 or the outer barrel portion 357 of the stationary barrel 350 must be prolonged in the optical axis direction so as to prevent any gap from being formed between the outer barrel portion 316 of the first lens group frame 310 and a front edge 357a of the outer barrel portion 357 of the stationary barrel 350 in a state wherein the first lens group frame 310 is located at the frontmost position (telephoto end). However, this arrangement increases the size of the lens barrel. Thus, in this embodiment, the covering barrel 370 is inserted between the first lens group frame 310 and the stationary barrel 350, and any gap formed between the first lens group frame 310 and the stationary barrel 350 is covered by moving the covering barrel 370 by the third lens group frame 330, which moves upon movement of the first lens group frame 310. More specifically, as shown in FIG. 6, when the outer barrel portion 316 of the first lens group frame 310 overlaps the outer barrel portion 357 of the stationary barrel 350 in a state wherein the first lens group frame 310 is located at the rearmost position (wide-angle end), the covering barrel 370 is arranged to overlap the outer barrel portion 357 of the stationary barrel 350. The covering barrel 370 is coupled to the third lens group frame 330 via the covering barrel coupling member 307, so that the covering barrel 370 moves in the optical axis direction together with the third lens group frame 330 upon movement of the first lens group frame 310. In this embodiment, the covering barrel 370 and the third lens group frame 330 are coupled to each other. However, any other structures may be adopted as long as the covering barrel 370 can be moved upon movement of the first lens group frame 310. For example, the covering barrel 370 and the fourth lens group frame 340 may be coupled to each other using, e.g., a pin, and the covering barrel 370 may move together with the fourth lens group frame 340. In this embodiment, since the second lens group frame 320 moves independently in a focusing operation unlike other lens group frames, it is not preferable to couple the covering barrel 370 and the second lens group frame 320.

When the photographer obtains a target photographing magnification by extending the first lens group frame 310 in the optical axis direction, he or she rotates the focus operation ring 390 to perform a focusing operation. Note that the focus operation ring 390 may be manually rotated, but may be rotated by driving the focusing motor arranged in the camera main body. Upon rotation of the focus operation ring 390, as described above, the second lens group cam pin 302 receives the rotational force from the second lens group straight slot 393 of the focus operation ring 390. This cam pin 302 moves in the direction parallel to the optical axis C while rotating about the optical axis upon reception of the rotational force from the focus operation ring 390 since it is inserted in the second lens group cam slot 362 of the cam barrel 360. Therefore, the second lens group frame 320 to which the cam pin 302 is fixed also moves in the optical axis direction while rotating about the optical axis. The second lens group cam pin 302 and the second lens group cam slot 362 operate not only in the zooming mode but also in the focusing mode. Thus, the relationship between the second lens group cam pin 302 and the second lens group cam slot 362 in the zooming and focusing modes will be briefly described below with reference to FIG. 7.

If the rotation angle of the cam barrel 360 upon movement of the first lens group frame 310 is θz, the rotation angle of the second lens group cam pin 302 relative to the second lens group cam slot 362 is also θz. The moving amount, in the direction parallel to the optical axis C, of the second lens group cam pin 302 at that time is $l_2$. The moving amount, in the optical axis direction, of the second lens group L2 required for focusing at the telephoto side is A ($<l_2$) in a direction from the telephoto end, T, toward the wide-angle end, W. On the other hand, the moving amount, in the optical axis direction, of the second lens group L2 required for focusing at the wide-angle side is B in the farther direction, from the wide-angle end W to the telephoto end T. Therefore, the moving range of the cam pin 302 upon focusing at the telephoto side falls within the moving range of the cam pin 302 upon rotation of the cam barrel 360, but the moving range of the cam pin 302 upon focusing at the wide-angle side falls outside the moving range of the cam pin 302 upon rotation of the cam barrel 360. For this reason, the length, in the direction parallel to the optical axis C, of the second lens group cam slot 362 corresponds to a sum of the length $l_2$ required upon rotation of the cam barrel 360 upon movement of the first lens group frame 310, and the length B required upon rotation of the focus operation ring 390 at the wide-angle side. In this embodiment, the moving amount B, in the optical axis direction, of the second lens group L2 required for focusing at the wide-angle side is different from its moving amount A at the telephoto side. However, in order to improve the operation feeling of the focus operation ring 390, the second lens group cam slot 362 is shaped so that the relative rotation angle, θw, of the cam pin 302 required for focusing at the wide-angle side is equal to its relative rotation angle θt at the telephoto side.

In the zoom lens barrel of this embodiment, since the cam barrel moves in the optical axis direction while rotating about the optical axis, and the moving amount of each lens group frame is determined by the moving amount obtained upon movement of the cam barrel in the optical axis direction in addition to its own moving amount upon rotation of the cam barrel, the moving amount of the lens, i.e., the zoom amount can be increased without increasing the size of the lens barrel itself.

In the present invention, since the synthesized focal length of the respective lens groups is detected by detecting the moving amount of the Xth lens group frame which moves upon movement of the first lens group frame but has a moving amount smaller than that of the first lens group frame, the length, in the optical axis direction, of the conductor pattern used for detecting the moving amount of the lens frame can be shortened. Therefore, the lens barrel can be made compact.

What is claimed is:

1. A zoom lens barrel which is attached to a camera main body, and attains zooming by moving a plurality of lenses in an optical axis direction of the lenses, comprising:

a cylindrical lens frame to hold the lenses on an inner circumferential surface side thereof, is formed with a lens cam slot having a spiral shape about an optical axis, is formed with a straight slot extending in a direction parallel to the optical axis, and is movable in the optical axis direction;

a cylindrical cam barrel which is rotatable about the optical axis and is movable in the optical axis direction;

a cylindrical stationary barrel formed with a cam barrel cam slot having a spiral shape about the optical axis;

a lens cam pin, one end portion of which is fixed to said cam barrel, and the other end portion of which is fitted in said lens cam slot of said lens frame;

a cam barrel cam pin, one end portion of which is fixed to said cam barrel, and the other end portion of which is fitted in said cam barrel cam slot of said stationary barrel;

a lens frame rotation regulation member which is not rotatable about the optical axis direction, and is inserted in said straight slot of said lens frame; and a zoom operation ring which is attached to said stationary barrel to be rotatable about the optical axis, and rotates said cam barrel cam pin without regulating movement, in the optical axis direction, of said cam barrel cam pin.

2. A zoom lens barrel which is attached to a camera main body and attains zooming by moving a plurality of lens groups in an optical axis direction, comprising:

a cylindrical first lens group frame which holds, on an inner circumferential surface side thereof, a first lens group, which is disposed at a position farthest from the camera main body, of the plurality of lens groups, is formed with a first lens group cam slot having a spiral shape about an optical axis, is formed with a first lens group straight slot extending in a direction parallel to the optical axis, and is movable in the optical axis direction;

a cylindrical lens group frame, which holds, on an inner circumferential surface side thereof, a lens group, which is disposed at a position nearer the camera main body than the first lens group, of the plurality of lens groups, and is movable in the optical axis direction;

a cylindrical cam barrel which is formed with a lens group cam slot having a spiral shape about the optical axis, is rotatable about the optical axis, and is movable in the optical axis direction;

a cylindrical stationary barrel which is formed with a cam barrel cam slot having a spiral shape about the optical axis, and is formed with a lens group straight slot extending in the direction parallel to the optical axis;

a first lens group cam pin, one end portion of which is fixed to said cam barrel, and the other end portion of which is inserted in said first lens group cam slot of said first lens group frame;

a cam barrel cam pin, one end portion of which is fixed to said cam barrel, and the other end portion of which is inserted in said cam barrel cam slot of said stationary barrel;

a lens group cam pin, one end portion of which is fixed to said lens group frame, and the other end portion of which is inserted in said lens group cam slot of said cam barrel and said lens group straight slot of said stationary barrel;

a lens frame rotation regulation member, one end portion of which is fixed to said lens group frame, and the other end portion of which is inserted in said first lens group straight slot of said first lens group frame; and a zoom operation ring which is attached to said stationary barrel to be movable about the optical axis, and rotates said cam barrel cam pin without regulating movement, in the optical axis direction, of the cam barrel cam pin.

3. A zoom lens barrel which is attached to a camera main body and attains zooming by moving a plurality of lens groups in an optical axis direction, comprising:

a cylindrical first lens group frame which holds, on an inner circumferential surface side thereof, a first lens group, which is disposed at a position farthest from the camera main body, of the plurality of lens groups, forms a portion of an outermost periphery of said lens barrel, a lens frame outermost peripheral portion, by a portion thereof, is formed with a first lens group cam slot having a spiral shape about an optical axis, is formed with a first lens group straight slot extending in a direction parallel to the optical axis, and is movable in the optical axis direction;

a cylindrical lens group frame, which holds, on an inner circumferential surface side thereof, a lens group, which is disposed at a position nearer the camera main body than the first lens group, of the plurality of lens groups, and is movable in the optical axis direction;

a cylindrical outer frame which has an outer frame outer peripheral portion, that neighbors the lens frame outermost peripheral portion and forms a portion of the outermost periphery of said lens barrel when said first lens group frame is located at a position closest to the camera main body in a moving range thereof in the optical axis direction, and is immovable in the optical axis direction with respect to the camera main body;

a cylindrical movement assist barrel which is formed with a lens group frame slot having a spiral shape about the optical axis, is rotatable about the optical axis, and is movable in the optical axis direction;

a cylindrical stationary barrel which is formed with a movement assist barrel cam slot having a spiral shape about the optical axis, and is formed with a lens group straight slot extending in the direction parallel to the optical axis;

a covering barrel which overlaps said outer frame in the optical axis direction when said first lens group frame is located at the position closest to the camera main body in the moving range thereof in the optical axis direction, and covers a gap formed between the lens frame outermost peripheral portion and the outer frame outer periphery portion upon movement of said first lens group frame in the optical axis direction;

a first lens group cam pin, one end portion of which is fixed to said movement assist barrel, and the other end portion of which is inserted in said first lens group cam slot of said first lens group frame;

a movement assist barrel cam pin, one end portion of which is fixed to said movement assist barrel, and the other end portion of which is inserted in said movement assist barrel cam pin of said stationary barrel;

a lens group cam pin, one end portion of which is fixed to said lens group frame, and the other end portion of which is inserted in said lens group cam slot of said movement assist barrel and said lens group straight slot of said stationary barrel;

a lens frame rotation regulation member which is not rotatable about the optical axis, and is inserted in said first lens group straight slot of said first lens group frame; and a covering barrel coupling member, one end portion of which is fixed to said lens group frame, and the other end portion of which is fixed to said covering barrel.

4. A zoom lens barrel according to claim 3, wherein one end portion of said lens frame rotation regulation member is fixed to said Xth lens group frame, and a portion thereof is inserted in said first lens group straight slot of said first lens group frame.

5. A zoom lens barrel according to claim 3, wherein said lens frame rotation regulation member and said covering barrel coupling member are a single member, one end portion thereof is fixed to said Xth lens group frame, the other end portion thereof is fixed to said covering barrel, and a portion thereof is inserted in said first lens group straight slot of said first lens group frame.

6. A zoom lens barrel which is attached to a camera main body and attains zooming by moving a plurality of lens groups in an optical axis direction, comprising:

a cylindrical first lens group frame which holds, on an inner circumferential surface side thereof, a first lens group, which is disposed at a position farthest from the camera main body, of the plurality of lens groups, is formed with a first lens group cam slot having a spiral shape about an optical axis, if formed with a first lens group straight slot extending in a direction parallel to the optical axis, and is movable in the optical axis direction;

a cylindrical lens group frame, which holds, on an inner circumferential surface side thereof, a lens group, which is disposed at a position nearer the camera main body than the first lens group, of the plurality of lens groups, is formed with a lens group cam slot having a spiral shape about the optical axis, and is movable in the optical axis direction while rotating about the optical axis;

a cylindrical stationary barrel;

a zoom operation ring which is attached to said stationary barrel to be rotatable about the optical axis, and rotates said lens group frame without regulating movement of said lens group frame in the optical axis direction;

a first lens group cam pin, one end portion of which is fixed to said lens group frame, and the other end portion of which is inserted in said first lens group cam slot of said first lens group frame;

a lens group frame pin, one end portion of which is inserted in said lens group cam slot of said lens group frame, and the other end portion of which is attached to said stationary barrel not to be rotatable about the optical axis; and a lens frame rotation regulation member which is not rotatable about the optical axis, and is inserted in said first lens group straight slot of said first lens group frame.

7. A zoom lens barrel according to claim 6, further comprising:

a second lens group frame which holds therein a second lens group, that is arranged at a position nearer the camera main body than the first lens group, of the plurality of lens groups, the other end portion of said lens group cam pin being fixed to said second lens group frame;

a cam barrel which is formed with a second lens group cam slot having a spiral shape about the optical axis, is rotatable about the optical axis, and is movable in the optical axis direction;

a cam barrel cam pin, one end portion of which is fixed to said cam barrel; and a rotation prevention mechanism which is arranged in association with said lens group frame and said cam barrel and prevents a relative rotation between said lens group frame and said cam barrel, wherein said zoom operation ring is formed with a cam barrel straight slot extending in the direction parallel to the optical axis, said stationary barrel is formed with a second lens group straight slot extending in the direction parallel to the optical axis, and a cam barrel cam slot having a spiral shape about the optical axis, the other end portion of said cam barrel cam pin, one end portion of which is fixed to said cam barrel, is inserted in said cam barrel cam slot and said cam barrel straight slot, the other end portion of said lens group cam pin, one end portion of which is inserted in said lens group cam slot of said lens group frame, is inserted in said second lens group cam slot and said second lens group straight slot, and the other end portion of a lens group guide pin, one end portion of which is fixed to said lens group frame or said cam barrel is inserted in a lens group guide slot.

8. A lens barrel which is attached to a camera main body and attains zooming by moving lenses having a common optical axis in a direction along the optical axis, comprising:

a cylindrical lens frame which is movable in the optical axis direction, has a zoom operation portion operated by a photographer to move said lens frame in the optical axis direction, holds the lenses on an inner circumferential surface side thereof, is formed with a lens cam slot having a spiral shape about the optical axis, and is formed with a straight guide slot extending in a direction parallel to an optical axis;

a cylindrical cam barrel which is rotatable about the optical axis and is movable in the optical axis direction;

a cylindrical stationary barrel which is formed with a cam barrel cam slot having a spiral shape about the optical axis;

a lens cam pin, one end portion of which is fixed to said cam barrel, and the other end portion of which is inserted in said lens cam slot of said lens frame;

a cam barrel cam pin, one end portion of which is fixed to said cam barrel, and the other end portion of which is inserted in said cam barrel cam slot of said stationary barrel; and a lens frame rotation regulation member which is not rotatable about the optical axis, and is inserted in said straight guide slot.

9. A zoom lens barrel which is attached to a camera main body, and changes a synthesized focal length of a plurality of lens groups by a zooming operation for moving the plurality of lens groups in an optical axis direction, comprising:

a first lens group frame which is movable in the optical axis direction, has a zoom operation portion operated by a photographer to move said lens frame in the optical axis direction, holds, on an inner circumferential surface side thereof, a first lens group, that is disposed at a position farthest from the camera main body and has a largest moving amount in the optical axis direction in the zooming operation, of the plurality of lens groups, is formed with a first lens group cam slot having a spiral shape about an optical axis, and is formed with a first lens group straight slot extending in a direction parallel to the optical axis;

a cylindrical lens group frame, which holds, on an inner circumferential surface side thereof, a lens group, that is disposed at a position nearer the camera main body than the first lens group and has a moving amount in the optical axis direction smaller than the first lens group in the zooming operation, of the plurality of lens groups, and is movable in the optical axis direction;

a cylindrical cam barrel which is formed with a lens group cam slot having a spiral shape about the optical axis;

a cylindrical stationary barrel which is formed with a cam barrel cam slot having a spiral shape about the optical axis, and a lens group straight slot extending in the direction parallel to the optical axis;

a first lens group cam pin, one end portion of which is fixed to said cam barrel, and the other end portion of which is inserted in said first lens group cam slot of said first lens group frame;

a cam barrel cam pin, one end portion of which is fixed to said cam barrel, and the other end portion of which is inserted in said cam barrel cam slot of said stationary barrel;

a lens group cam pin, one end portion of which is fixed to said lens group frame, and the other end portion of which is inserted in said lens group cam slot of said cam barrel, and said lens group straight slot of said stationary barrel;

a lens frame rotation regulation member which is not rotatable about the optical axis, and is inserted in said first lens group straight slot of said first lens group frame; and a zoom position detection mechanism for obtaining the synthesized focal length of the plurality of lens groups by detecting a relative positional relationship between said stationary barrel and said lens group.

10. A zoom lens barrel according to claim 9, wherein said zoom position detection mechanism comprises:

a conductive brush, a proximal end portion of which is fixed to one of said Xth lens group frame and said stationary barrel; and a conductor pattern which is fixed to the other of said Xth lens group frame and said stationary barrel, so as to contact a distal end portion of said conductive brush, and is formed with a conductive portion having a conductor and a non-conductive portion having no conductor in the optical axis direction, and said zoom position detection mechanism obtains the synthesized focal length of the plurality of lens groups by detecting whether the distal end portion of said conductive brush contacts the conductive portion or the non-conductive portion of said conductor pattern.

11. A zoom lens barrel according to claim 9, wherein one end portion of said lens frame rotation regulation member is fixed to said Xth lens group frame, and the other end portion thereof is inserted in said first lens group straight slot of said first lens group frame.

12. A zoom lens barrel that attains zooming by moving a plurality of lens groups in an optical axis direction, comprising:

a cylindrical first lens group frame which holds, on an inner circumferential surface side thereof, a first lens group, disposed at a position farthest from a camera main body, of the plurality of lens groups, is formed with a first lens group cam slot having a spiral shape about an optical axis;

a cylindrical lens group frame, which holds, on an inner circumferential surface side thereof, a lens group, which is disposed at a position nearest the camera main body;

a cylindrical cam barrel which is formed with a lens group cam slot having a spiral shape about the optical axis, is rotatable about the optical axis, and is movable in the optical axis direction;

a cylindrical stationary barrel which is formed with a lens group straight slot extending in the direction parallel to the optical axis;

a first lens group cam pin, one end portion of which is fixed to said cam barrel, and the other end portion of which is inserted in said first lens group cam slot of said first lens group frame;

a cam barrel cam pin, one end portion of which is fixed to said cam barrel, and the other end portion of which is connected to said stationary barrel;

a lens group cam pin, one end portion of which is fixed to said lens group frame, and the other end portion of which is inserted in said lens group cam slot of said cam barrel and said lens group straight slot of said stationary barrel; and a lens frame rotation regulation member.

\* \* \* \* \*